(12) United States Patent
Clohset et al.

(10) Patent No.: US 12,548,232 B2
(45) Date of Patent: *Feb. 10, 2026

(54) ATOMIC MEMORY UPDATE UNIT AND METHODS

(71) Applicant: Imagination Technologies Limited, Kings Langley (GB)

(72) Inventors: Steven J. Clohset, San Francisco, CA (US); Jason R. Redgrave, Mountain View, CA (US); Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 88 days.

This patent is subject to a terminal disclaimer.

(21) Appl. No.: 18/418,305

(22) Filed: Jan. 21, 2024

(65) Prior Publication Data
US 2024/0185501 A1 Jun. 6, 2024

Related U.S. Application Data

(63) Continuation of application No. 17/571,104, filed on Jan. 7, 2022, now Pat. No. 11,880,925.

(51) Int. Cl.
*G06T 15/00* (2011.01)
*G06F 12/0804* (2016.01)
(Continued)

(52) U.S. Cl.
CPC ........ *G06T 15/005* (2013.01); *G06F 12/0804* (2013.01); *G06T 1/60* (2013.01);
(Continued)

(58) Field of Classification Search
CPC ......... G06T 1/60; G06T 15/005; G06T 15/06; G06T 17/10; G06T 5/77; G06F 12/0804;
(Continued)

(56) References Cited

U.S. PATENT DOCUMENTS 5,887,160 A * 3/1999 Lauritzen .............. G06F 9/3867
712/E9.046
5,889,983 A 3/1999 Mittal et al.
(Continued)

FOREIGN PATENT DOCUMENTS

CN 102591909 A 7/2012
EP 0930574 A2 7/1999
(Continued)

OTHER PUBLICATIONS

Kuo et al., "Fast Accurate Rendering," 2008 13th Asia-Pacific Computer Systems Architecture Conference, Sep. 16, 2008, 7 pages.

*Primary Examiner* — Sing-Wai Wu
(74) *Attorney, Agent, or Firm* — Potomac Law Group, PLLC; Vincent M DeLuca

(57) ABSTRACT

In an aspect, an update unit can evaluate condition(s) in an update request and update one or more memory locations based on the condition evaluation. The update unit can operate atomically to determine whether to effect the update and to make the update. Updates can include one or more of incrementing and swapping values. An update request may specify one of a pre-determined set of update types. Some update types may be conditional and others unconditional. The update unit can be coupled to receive update requests from a plurality of computation units. The computation units may not have privileges to directly generate write requests to be effected on at least some of the locations in memory. The computation units can be fixed function circuitry operating on inputs received from programmable computation elements. The update unit may include a buffer to hold received update requests.

20 Claims, 15 Drawing Sheets

(51) Int. Cl.
  *G06F 12/0862* (2016.01)
  *G06F 12/126* (2016.01)
  *G06T 1/60* (2006.01)
  *G06T 5/77* (2024.01)
  *G06T 15/06* (2011.01)
  *G06T 17/10* (2006.01)
(52) U.S. Cl.
  CPC ............... *G06T 5/77* (2024.01); *G06T 15/06* (2013.01); *G06T 17/10* (2013.01); *G06F 12/0862* (2013.01); *G06F 12/126* (2013.01); *G06F 2212/1024* (2013.01); *G06F 2212/302* (2013.01); *G06F 2212/452* (2013.01); *G06F 2212/455* (2013.01)
(58) Field of Classification Search
  CPC ............... G06F 12/0862; G06F 12/126; G06F 2212/1024; G06F 2212/302; G06F 2212/452; G06F 2212/455
  See application file for complete search history.

(56) References Cited

U.S. PATENT DOCUMENTS

| | | |
|---|---|---|
| 6,651,124 B1 | 11/2003 | McAllister |
| 7,627,723 B1 | 12/2009 | Buck et al. |
| 2006/0161919 A1 | 7/2006 | Onufryk et al. |
| 2007/0182732 A1 | 8/2007 | Woop et al. |
| 2008/0114824 A1 | 5/2008 | Mejdrich et al. |
| 2008/0192050 A1 | 8/2008 | Schardt et al. |
| 2008/0276025 A1 | 11/2008 | Cherem |
| 2008/0320240 A1 | 12/2008 | Savic |
| 2009/0128562 A1 | 5/2009 | McCombe |
| 2009/0322752 A1 | 12/2009 | Peterson et al. |
| 2010/0073370 A1 | 3/2010 | McCombe et al. |
| 2010/0122041 A1 | 5/2010 | Nakaike |
| 2011/0153989 A1 | 6/2011 | Rajwar et al. |
| 2012/0185447 A1 | 7/2012 | Zhang |
| 2012/0198162 A1 | 8/2012 | Chachad et al. |
| 2012/0249553 A1 | 10/2012 | Peterson et al. |
| 2013/0002672 A1 | 1/2013 | Peterson et al. |
| 2013/0050213 A1 | 2/2013 | McCombe et al. |
| 2013/0147803 A1 | 6/2013 | Peterson et al. |
| 2013/0243003 A1 | 9/2013 | Oda |
| 2014/0168238 A1 | 6/2014 | Luebke et al. |
| 2014/0281323 A1 | 9/2014 | Duluk, Jr. |

FOREIGN PATENT DOCUMENTS

| | | |
|---|---|---|
| EP | 1612661 A2 | 1/2006 |
| WO | 90/05953 A1 | 5/1990 |
| WO | 2009117691 A2 | 9/2009 |

\* cited by examiner

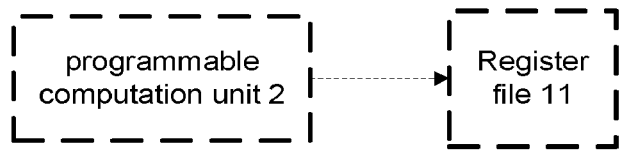
FIG. 4A
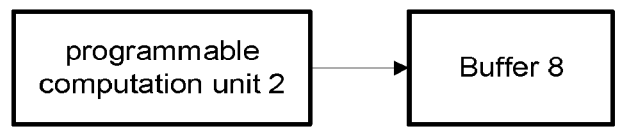
FIG. 4B
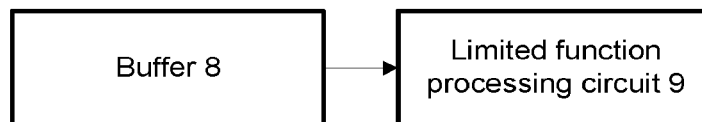
FIG. 4C
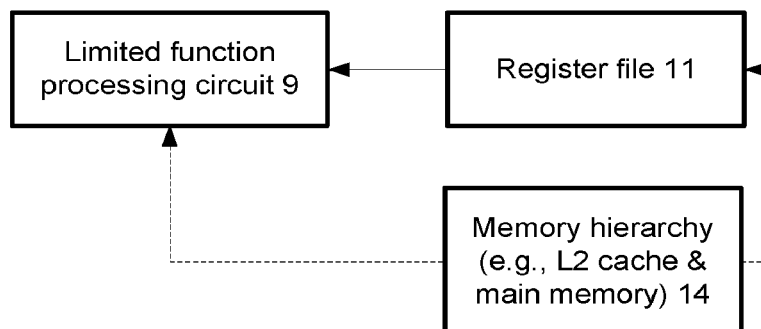
FIG. 4D
FIG. 4E
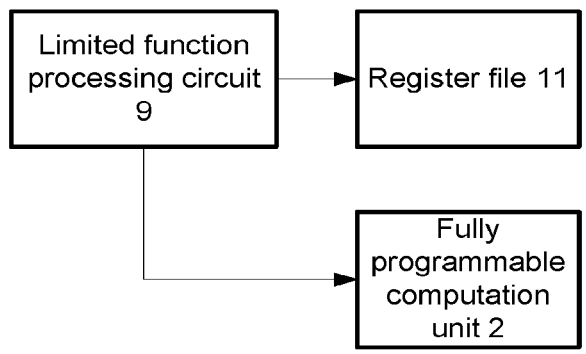
FIG. 4F
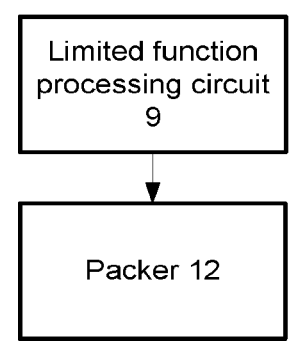

Instruction 1
Instruction 2
...
If (Boxtest(&box A, Ray Ref)) ← Block for return
    If (HasPrimitives(&box A))
        PrimTestList (Ray Ref, GetPrimAddr(&Box A)) ← Block for return
    else
        BoxTestList (Ray Ref, GetChildList(&Box A))
Instruction 3

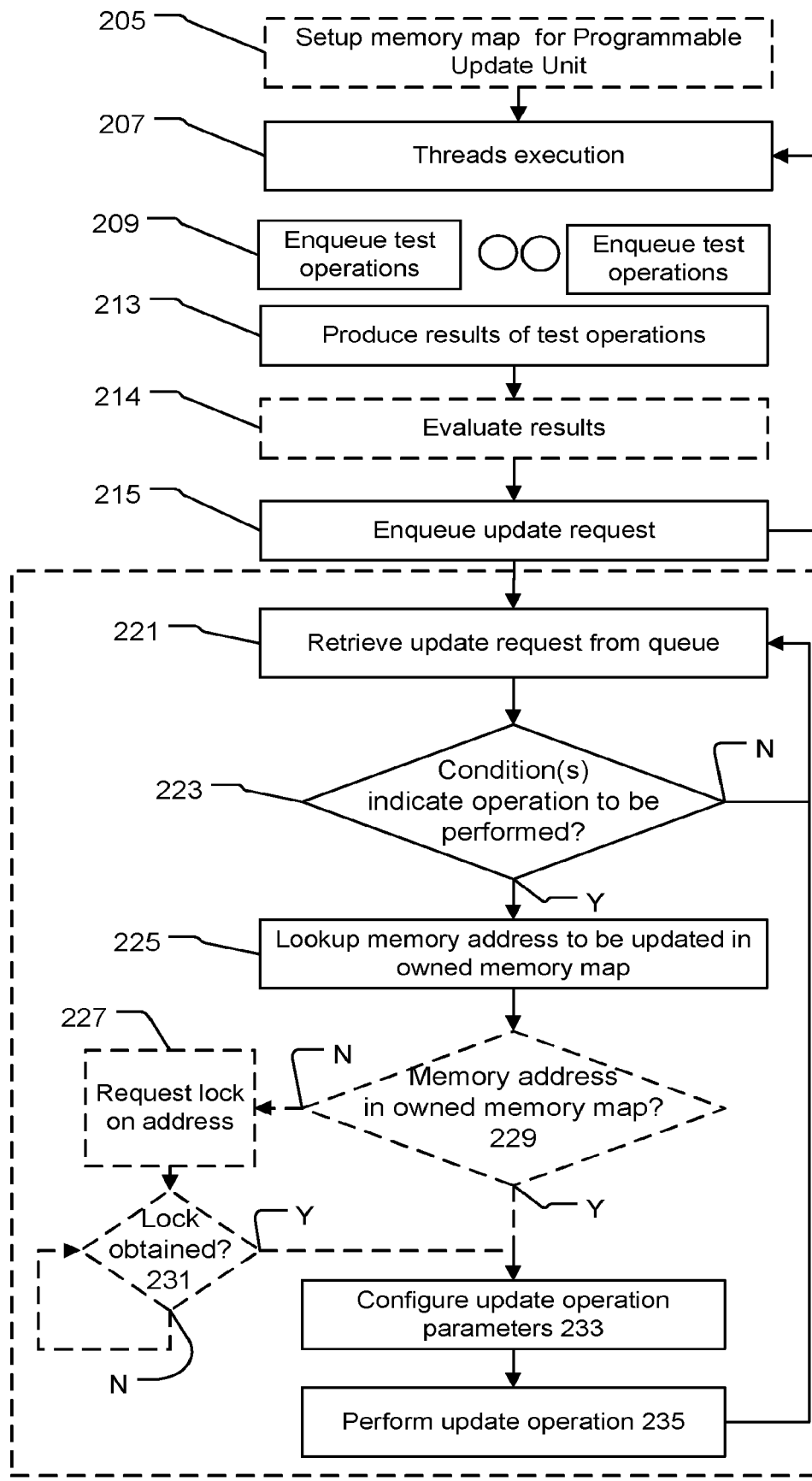

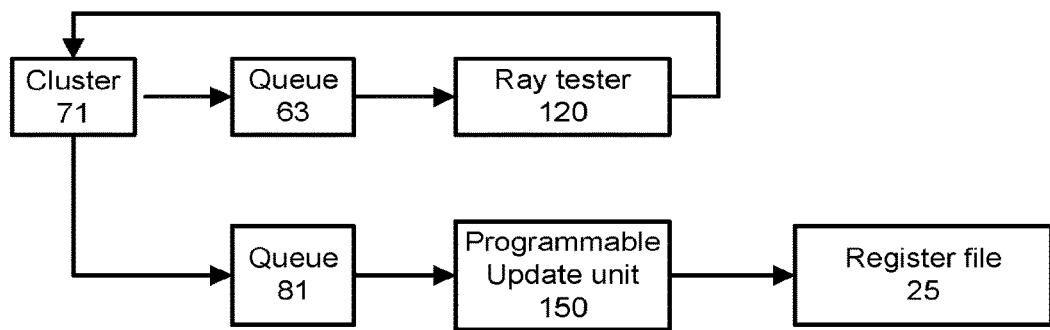
FIG. 8A
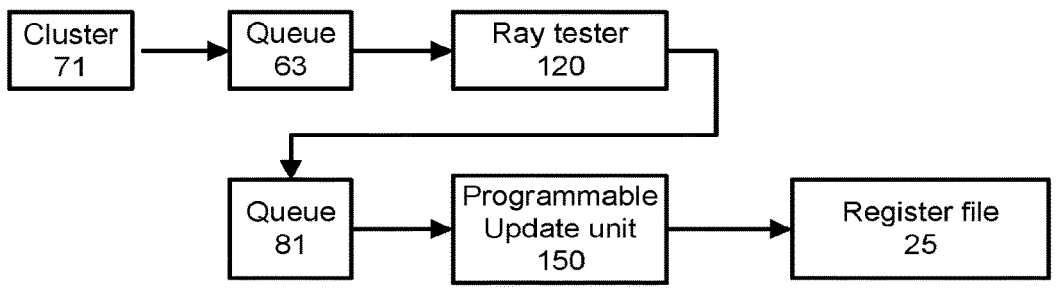
FIG. 8B
FIG. 9A
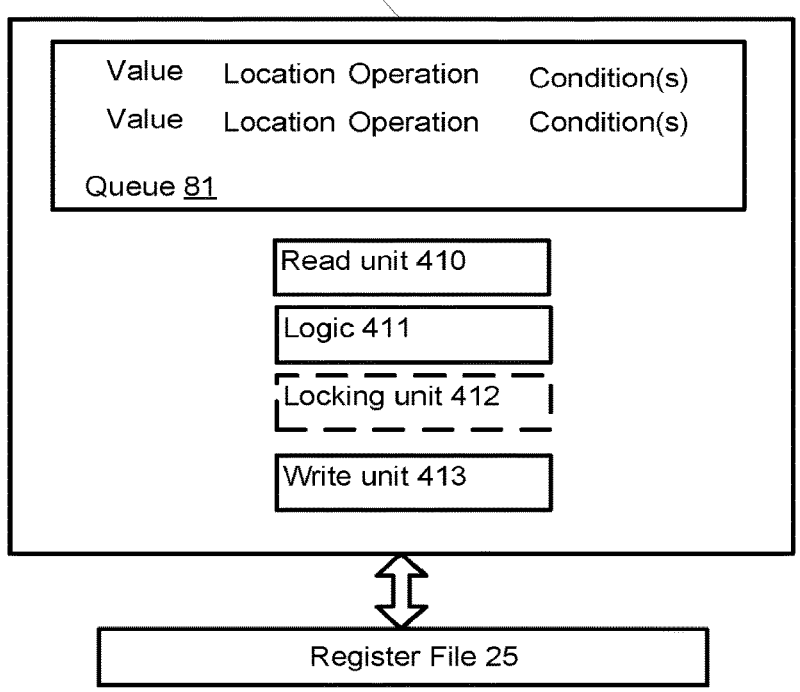

ATOMIC MEMORY UPDATE UNIT AND METHODS

CROSS REFERENCE TO RELATED APPLICATIONS

This application is a continuation under 35 U.S.C. 120 of application Ser. No. 17/571,104 filed Jan. 7, 2022, now U.S. Pat. No. 11,880,925, which is a continuation of prior application Ser. No. 15/275,645 filed Sep. 26, 2016, now U.S. Pat. No. 11,257,271, which is a continuation of prior application Ser. No. 14/494,496 filed Sep. 23, 2014, now U.S. Pat. No. 9,466,091, which claims priority under 35 U.S.C. 119 from U.S. Provisional App. No. 61/882,755, entitled "COMPUTATION ARCHITECTURES WITH TASK-SPECIFIC ACCELERATORS", filed on Sep. 26, 2013, and from U.S. Provisional App. No. 61/955,116, entitled "Pre-fetched Counted Reads" filed on Mar. 18, 2014, and from U.S. Provisional App. No. 61/955,086, entitled "Atomic Memory Update Unit & Methods" filed on Mar. 18, 2014, all of which are incorporated by reference in their entireties herein.

BACKGROUND

Field

In one aspect, the disclosure generally relates to computation architectures that perform multi-threaded processing and may consume shared data, other aspects relate to include task-specific circuitry for graphics processing and in one more particular aspect, task-specific structures for operations performed during ray tracing, still further aspects relate to caching behavior in processor systems.

Description of Related Art

Graphics Processing Units (GPUs) provide relatively large-scale parallel processing for graphics operations. Some GPUs may use one or more Single Instruction Multiple Data (SIMD) computation units that are generally programmable. Such GPUs may obtain higher performance largely by using more transistors to replicate computation units, and by providing larger memories and more bandwidth to such memories. This approach theoretically allows a large part of the transistor and routing budget for a GPU to be used for general purpose computation. Some GPUs use different processing units for different portions of a graphics pipeline, such as having separate geometry processors and pixel shading engines. GPUs may provide a memory subsystem that allows memory accesses by instructions being executed on any of these units. A GPU may share a main system memory with other system components (e.g., a CPU); a GPU also may have internal caches.

SUMMARY

One aspect relates to a machine-implemented method of updating a memory. The method includes receiving, from a computation unit, a request to update a memory. The request includes (e.g., references or explicitly provides) a first value to be written to a specified location in the memory and a condition to be satisfied in order for the first value to be used to update the specified location in the memory. The condition comprises a reference to a second location in the memory, and a criteria to be satisfied by a value in the second location in the memory. The second location in the memory is accessed and it is determined whether the value in the second location in the memory satisfies the criteria. If so, then the first value is used to update the specified location in the memory atomically. Atomically comprises that the value in the specified location in the memory is not changed between when the update unit accesses the value in the second location in the memory and when the update unit updates the value in the specified location in the memory, in an example.

In another aspect, an apparatus for concurrent computation comprises an update unit, a memory; and a plurality of computation cores coupled to the update unit through an interconnect. Each computation core is capable of executing a sequence of instructions, and are operable to output update requests to the update unit under control of the sequence of instructions. The update requests are outputted to change data stored in portions of the memory to which the sequence of instructions has write permissions. Each update request includes a first value to be used to update a specified location in the memory and a condition to be satisfied in order for the first value to be used to update the specified location in the memory. In one example, the condition comprises a reference to a second location in the memory, and a criterion to be satisfied by a value in the second location in the memory. The update unit is configured to initiate and complete each update request atomically, which, in an example, comprises that the value in the second location in the memory is not changed between when the update unit accesses the value in the second location in the memory and when the update unit updates the first value to the specified location in the memory.

An aspect relates to a machine-implemented method of updating a memory. The method performs an operation to generate a first value and an identifier to a location in a memory and producing an update request including the first value and the identifier to the location in the memory. The method provides the update request to a separate update unit that is coupled to receive update requests from each of a plurality of computation units. The update unit atomically performing a method in which a value in the identified location in the memory is accessed, it is determined whether the accessed value satisfies a condition based on the first value, and the update unit responsively changes a value in a location in the memory.

For example, the location at which the value is changed by the update unit is specified by the update request and can be different from the location in the identified location in the memory. The update unit can increment, decrement, substitute, as example updates, each of which can be conditional on a criteria specified in the update request. In one example, the update request further specifies a second value and an identifier to a second location in the memory. The method then includes substituting a value in the second location in the memory with the second value atomically with the determining whether a condition is satisfied.

Some implementations may provide processing units that do not have a capability to independently initiate write transactions on a shared memory. The plurality of processing units can include fixed function processing units, configured to perform one or more pre-determined algorithms on the received inputs. The update unit further may discard the update request if the criteria has not been satisfied.

In a further aspect of the disclosure, a computing apparatus comprises a main memory, a cache memory coupled with the main memory; and a processor configurable with a thread of instructions. The instructions in the thread are selected from an instruction set and the instruction set comprises an instruction that causes identified data to be loaded from the main memory to the cache memory and indicates an expected count of reads to be made for that data. The cache memory is configured to avoid evicting that data from the cache memory until an effective number of reads is determined to meet the expected count of reads.

The cache memory may include a cache read agent that tracks the effective number of reads of that data, by receiving read requests and incrementing a count. The processor may be capable of generating read requests, under control of instructions configuring the processor, of the pre-fetched data. The read requests may be from different threads than a thread that initiated the pre-fetch, and such a read request indicates an effective number of reads represented by that single read request. The effective number of reads represented by each read request can be determined based on a number of elements to be processed concurrently in a Single Instruction Multiple Data execution unit using the data. The cache memory can be configured to track an expected count of reads and a number of reads on each word a cache line. The cache memory can be configured to incorporate the expected effective number of read requests into a cache eviction algorithm and to track an effective number of reads that have been made for the at least one data element. The cache eviction algorithm comprises flagging a location storing at least a portion of the pre-fetched data as being evictable, responsive to determining that the expected number of reads have been served by the cache memory.

Such apparatus also may comprise a scheduler configured to identify groupings of elements that can participate in a computation that involves at least one data element in common. The scheduler can cause a pre-fetch request that identifies the at least one data element in common, to be fetched from the main memory into the cache memory, and which indicates an expected effective number of reads to be made of the cache for the identified at least one data element, during execution of the computation for the grouped elements by the execution unit.

In another aspect, a method of computation in a parallelized computing system comprises determining, such as in a scheduler, data to be used in a plurality of computations and forming a pre-fetch read request that indicates the data and a number of reads of the data to be expected during execution of the plurality of computations. The method also can involve providing the pre-fetch read request to a memory controller. The memory controller causes the data to be fetched from an element of a memory hierarchy and stored in an element of the memory hierarchy closer to a plurality of computation units than the element from which the data was fetched. A plurality of computations are performed in a plurality of computation units, and the performing of the plurality of computations generates individual read requests for the data. A number of the read requests is tracked. The number of read requests and the indicated number of reads are used to control when the pre-fetched data is permitted to be evicted from the element of the memory hierarchy from which it was read during the plurality of computations.

The eviction of the pre-fetched data can be controlled by flagging a location storing at least a portion of the pre-fetched data as being evictable, responsive to determining that the expected number of reads have been served by the cache memory. The eviction of the pre-fetched data also can be controlled by identifying one or more cachelines containing the data to which the expected number of reads pertained as being least recently used.

In a specific application example, at the scheduler, a group of rays is identified, which are to be tested for intersection against one or more shapes located in a 3-D scene. The forming of the pre-fetch request includes defining the one or more shapes and indicating a number of rays in the group as the effective expected number of reads. Methods can be performed by machines under control of machine executable instructions stored in a memory.

In another aspect according to the disclosure, a method of computation in a parallelized computing system includes identifying a plurality of first data elements that require a common data element during execution of different instances of a thread of computation that use different of the first data elements as inputs. The method arranges for execution of the different instances of the thread on one or more computation units. A pre-fetch read request to a memory unit is dispatched. The memory unit interfaces with a memory and is configured to retrieve data from the memory for storage in a cache, responsive to the pre-fetch read request. Requests for the retrieved data are services and a total effective number of reads represented by the serviced requests is estimated. Eviction of the retrieved data can be prevented until the estimate of the total effective number of read requests approaches an expected number of read requests for the retrieved data.

One aspect comprises a method of graphics processing of a 3-D scene using ray tracing. The method comprises executing a thread of computation in a programmable computation unit. The executing of the thread comprises executing an instruction, from an instruction set defining instructions that can be used to program the programmable computation unit. The instruction causes issuance of an operation code including data that identifies a ray, one or more shapes, and an operation to be performed for the ray with respect to the one or more shapes. The operation to be performed is selected from a pre-determined set of operations. The method also comprises buffering the operation code in a non-transitory memory and reading the operation code and performing the operation specified by the operation code for the ray, within a logic module that executes independently of the programmable computation unit and is capable of performing operations consisting of the operations from the pre-determined set of operations.

Another aspect includes an apparatus for rendering images from descriptions of 3-D scenes. Such apparatus has a programmable computation unit configured to execute a thread of instructions. The instructions are from an instruction set defining instructions that can be used to program the programmable computation unit. The thread of instructions comprises an instruction capable of causing issuance of an operation code including data that identifies a ray, one or more shapes, and an operation to be performed for the ray with respect to the one or more shapes. The operation to be performed is selected from a pre-determined set of operations. The apparatus also comprises an interconnect configured to receive the operation code from the programmable computation unit and buffer the operation code in a non-transitory memory and a logic module that executes independently of the programmable computation unit. The logic module is capable of performing operations consisting of the operations from the pre-determined set of operations and is configured for reading the buffered operation code and performing the operation specified by the operation code for the ray and the one or more shapes.

BRIEF DESCRIPTION OF THE DRAWINGS

For a fuller understanding of aspects and examples disclosed herein, reference is made to the accompanying drawings in the following description.

FIGS. 4A-4F depict an example progression of data and control so that a programmable computation unit can control a limited function processing circuit;

FIG. 7 depicts an example process of ray test operations enqueued and updates being effected using an update unit;

FIGS. 8A and 8B depict examples of different flows of data through components of the example apparatus of FIG. 3.

FIGS. 9A and 9B depict different examples of an implementation of an update unit;

DETAILED DESCRIPTION

Figure 1:
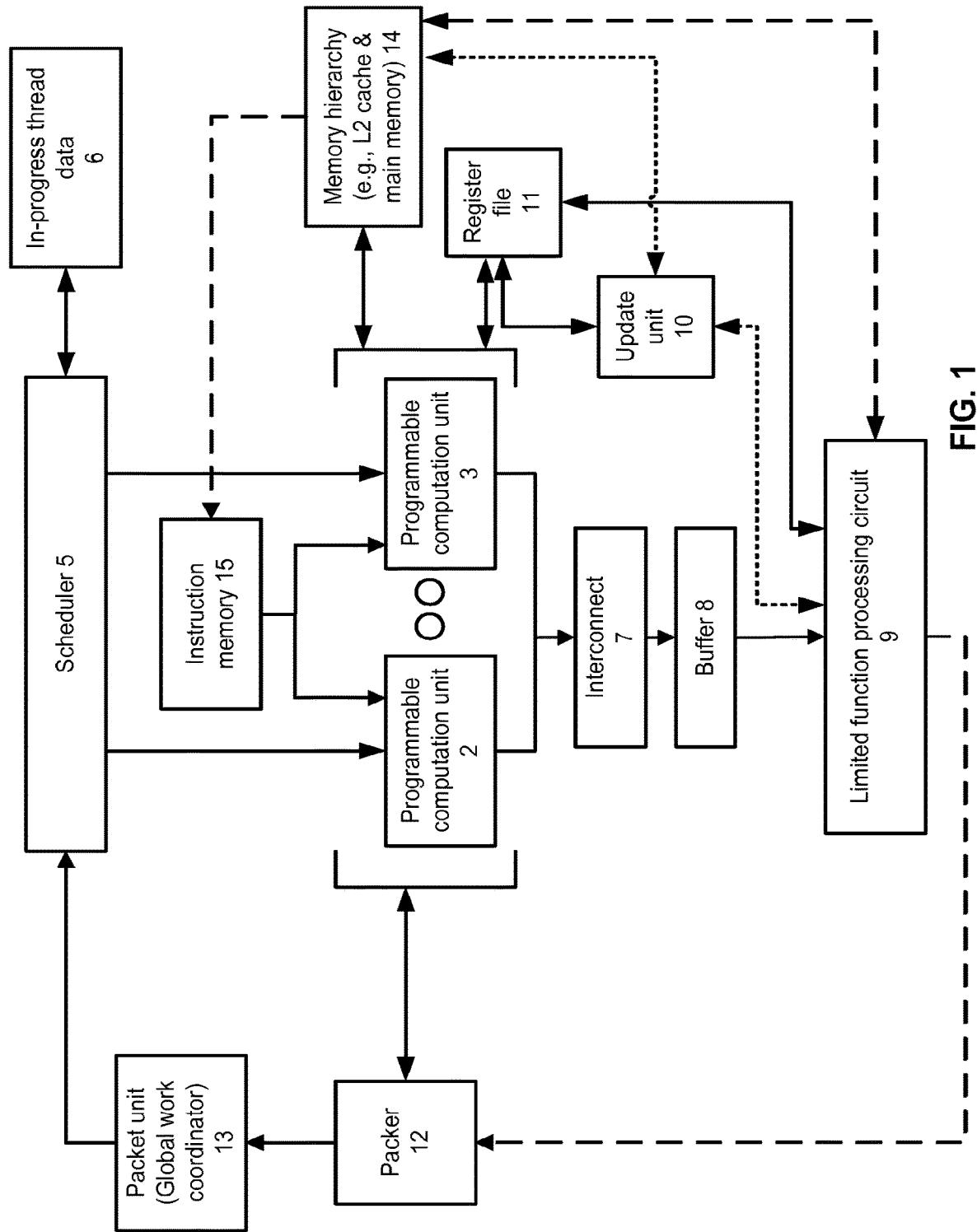
FIG. 1 depicts an overview of example components of an apparatus according to the disclosure.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

In typical 3-D rendering, a 3-D scene is converted into a 2-D representation for display (although such usage is by way of example and not limitation). Such conversion may include selecting a camera position, from which the scene is viewed. The camera position frequently represents a location of a viewer of the scene (e.g., a gamer, a person watching an animated film, etc.) The 2-D representation is usually at a plane location between the camera and the scene, such that the 2-D representation comprises an array of pixels at a desired resolution. A color vector for each pixel is determined through rendering. During ray tracing, rays can be initially cast from the camera position and intersect the plane of the 2-D representation at different points, and continue in(to) the 3-D scene.

In some implementations, all of the data affecting pixels in an image to be rendered comes from ray tracing operations. In other implementations, ray tracing may be used to achieve selected effects, such as global illumination, while surface visibility and initial shading of visible surfaces are handled according to a rasterization approach to 3-D rendering. In these implementations, much of the rendering work may be performed by one or more programmable computation units. When code executing on a programmable computation unit is to emit a ray to be traversed in a 3-D scene, such code could directly call a ray traversal routine that would accept a definition of the ray and return a result of the intersection testing. Such result can be an intersection detected for the ray, and in some circumstances, may be a closest detected intersection. Such a ray traversal routine can itself be implemented by code executing on a programmable computation unit.

However, in one example implementation according to the disclosure, software can be exposed to a more granular view of ray traversal, in which machine readable code executing on a processor can control each operation occurring during ray traversal. For example, software can define each intersection test to be undertaken between acceleration structure elements and a given ray. These tests can come from a plurality of concurrently executing elements (e.g., different threads of computation) and can be queued to be performed by a configurable special purpose test unit (such test unit may be implemented as a special purpose circuit that supports a pre-defined set of operations). In one example, the configurable special purpose test unit can be configured to test a ray for intersection with a shape from any of a set of pre-defined shape types. Circuitry implementing a configurable test unit is reused as permitted by the type of operations performed for the intersection tests that are implemented by the configurable special purpose test unit. In particular, there are a variety of ways of testing a given type of acceleration structure element or primitive for intersection with a ray. The implementation of the configurable test unit is based on which testing processes are to be supported, and the implementation can be guided by a design goal of allowing reuse among functional components in the configurable special purpose test unit.

Such implementation can account for a type or types of acceleration structure elements to be supported (e.g., a kD-tree, a voxel grid, a hierarchy of axis aligned bounding boxes, a sphere hierarchy, and so on). Such implementation also can account for a type or types of primitives to be supported, such as a triangular primitive. In the case of a triangular primitive, there are a variety of known ways to check for intersection between a ray and a triangular primitive. An implementation of a triangle test can be selected according to a variety of considerations; one relevant consideration in the context of the present disclosure may be selecting a triangle test that can be implemented in hardware that can also be used (at least to some extent) for performing acceleration structure element intersection tests. Thus, the special purpose test unit can be designed as an implementation-specific circuit, according to an overall system architecture goal, which may include supporting a specified one or more types of acceleration structures and one or more types of primitives.

In another aspect, a task collector can group portions of computation to be performed. The grouping can be based on commonality of the computation and/or commonality of data to be used during such computation. The collector can interface with a pool of threads that represent the portions of computation from which groupings of these portions can be selected to be scheduled or queued for execution. The collector can generate pre-fetch reads with cache control guidance that indicates a number of reads to be expected for a data element that will be used during execution of a grouping of computation. This guidance is used in cache control or eviction processes, such as to identify candidates for eviction from a cache.

In another aspect, a computation system provides an update unit, to which can be delegated write privileges to memory locations, such as locations in a register file. Update unit can perform updates atomically. Atomic can mean that all the operations that occur within the update unit itself appear as one operation that is visible externally to the update unit. An implication of this can vary among implementations. For example, where an update unit comprises combinatorial logic that can complete within one clock event, and have data ready before a next clock event, there would be no opportunity for any sub-portion of the processing within the update unit to cause an effect to be externally visible before that next clock edge. A requirement of which parts of the processing must be atomic also can differ in implementations. For example, an update unit may need to read from one or more memory locations, perform some calculations, determine whether a value is to be written and a value to write, and write the value in an atomic manner. Satisfying atomicity can be posed in functional terms, such as requiring that another unit not read corrupt (partially written) data. In other implementations, atomic may provide that two or more memory locations will be updated together. Where implementations perform multi-cycle reads, update unit may lock a shared memory location to be updated when a write is in progress. Not all implementations would require locking even under such circumstance, and some implementations may simply rely on correctness of executing software or correct scheduling of such software, or other elements in the system that would attempt a conflicting memory transaction. Some implementations may have a capability to cause a conflicting memory transaction (e.g., only a single port to the memory, e.g., register file, being updated.) Other approaches delegate all write transactions to such memory locations to the update unit.

Example specific usages for such an update unit, in a context of graphics processing, include that a task of finding a closest intersection for a ray can be dispersed among a plurality of concurrently-executing processing elements. These processing elements may generate updates to a current closest primitive intersection for a ray. The current closest intersection may be stored in a register file. Rather than having processing elements arbitrate among themselves to effect an update, an update unit can receive each update and handle the updates on behalf of the processing elements. The update unit can be made to implement a variety of updates in an efficient manner. Updates can be specified to have different characteristics; for example, a relaxed ordering of updates may be implemented for ray intersection testing.

The following disclosure provides specific examples and other disclosure concerning these aspects and other aspects.

FIG. 1 depicts a block diagram of components of an example system 1, in which one or more aspects of the disclosure can be implemented. System 1 includes a plurality of programmable computation units (units 2 and 3 depicted). These capable of being programmed to execute instructions from an instruction memory 15. Instruction memory 15 can be implemented, for example, as an instruction cache, which receives instructions from a memory hierarchy 14, which can be implemented with one or more of an L2 cache, an L3 cache, and a main system memory, for example. Programmable computation units 2 and 3 can each be capable of executing multiple threads of computation. Programmable computation units 2 and 3 can be scheduled by a scheduler 5. Scheduler 5 can use a store 6 of in-progress thread data (e.g., instruction pointers and a current state of a given thread for threads that have started but not completed execution). For example, data can indicate whether each thread is in a blocked or ready state, and can indicate a next instruction to be executed for that thread.

Implementations of scheduler 5 can operate at a particular level of granularity, such that threads can be swapped out or otherwise be scheduled to use a subset of resources in each computation unit more or less frequently in different implementations. Some implementations may allow independent thread scheduling for each instruction scheduling opportunity. Implementations of programmable computation units 2-3 may be single instruction issue, or multiple instruction issue, on a given clock cycle, and may be pipelined to varying degrees. Each of the units 2-3 also may be capable of executing Single Instruction Multiple Data (SIMD) instructions in a SIMD execution unit; a number of entries in such SIMD instructions may vary in different implementations (and for different data types).

Programmable computation units 2-3 may use a register file 11 as a first level working memory that is shared among units 2-3. Programmable computation units 2-3 may also directly access (without intermediate storage) data from an element of memory hierarchy 14 (e.g., L2 cache). In other implementations, data from memory hierarchy 14 may be loaded into register file 11 and then used. Portions of register file 11 may be memory mapped to portions of memory hierarchy 14.

Programmable computation units 2-3 communicate to a buffer 8 through an interconnect 7. Buffer 8 is coupled with a limited function processing circuit 9. Buffer 8 may be implemented as a queue, which in turn can be implemented using a dedicated hardware resource, in an example. Buffer 8 may be addressable through setting a particular combination of bit lines (to distinguish among different functional elements that are coupled with interconnect 7.) Register file 11 may also be accessed by limited function processing circuit 9.

An update unit 10 is coupled with programmable computation units 2-3 and also can be coupled with limited function processing circuit 9. Update unit 10 will be explained in more detail below. System 1 also may include a packet unit 13, which can function as a global work coordinator. Packet unit 13 receives inputs from a packer 12, which is coupled to receive data from programmable computation units 2-3 and optionally from limited function processing circuit 9. Packet unit 13 functions to assemble groupings of units of work that have some common element. In one example, packet unit 13 is responsible for determining sets of threads that are to begin execution (where individual instructions are scheduled by scheduler 5). For example, groupings can be formed of threads that are different instances of the same program module. Groupings also can be formed for threads that will use one or more of the same data elements during execution. A combination of multiple criteria can be implemented (e.g., instances of the same program and using the same data element(s). These groupings are determinable from data from packer 12, and in some cases, also may use information about an organization of data in register file 11 and/or memory hierarchy 14. For example, packer 12 may receive information about a result of a certain portion of computation, which controls what processing is to be performed next, for particular threads or data elements. Then, based on those results, packet unit 13 can make another grouping that will be scheduled.

In a specific example, rays can be traversed within a 3-D scene, with constituent operations of traversing the ray through an acceleration structure, and then testing the ray for intersection with a remaining set of primitives that could not be excluded during the traversal through the acceleration structure. In some implementations, each step of traversal may be scheduled as a separate thread instance of a traversal code module, which generates a result indicating whether a particular ray or rays needs to be further traversed within a particular bounding element of the acceleration structure. Packer 12 receives these individual results and then packet unit 14 can assemble a set of traversal thread instances that all need to be tested for the same element. Thus, packet unit 14 functions to reduce traffic across an interconnect to memory hierarchy 14 by causing threads that will use the same element of an acceleration structure or the same primitives to be executing in a similar timeframe on programmable computation units 2-3.

Some of the threads of instructions executing on programmable computation units 2-3 may be configured to emit operation codes that are directed, through interconnect 7 and buffer 8, to limited function processing circuit 9, which will cause this circuit 9 to perform an operation selected from a pre-defined set of operations and produce a result that can be outputted to one or more of packer 12, update unit 10 and register file 11. More detailed examples of this as provided below.

Figure 2:
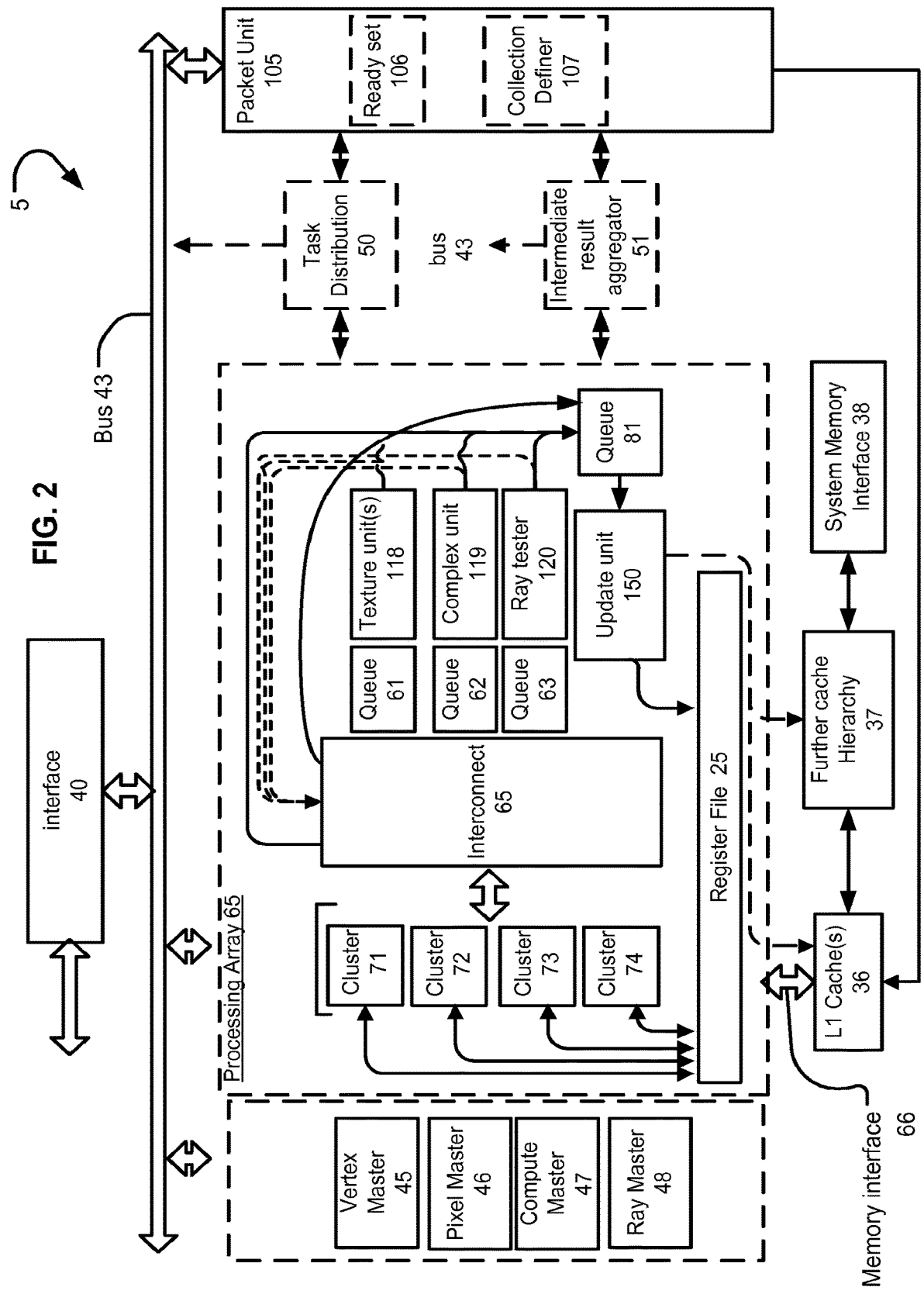
FIG. 2 depicts a more detailed example of an apparatus in which aspects of the disclosure can be implemented.

FIG. 2 presents an example implementation of system 1 from FIG. 1, which may be implemented in a highly parallelized graphics processing unit, for example, and in a more particular example, a graphics processing unit that has elements for accelerating the performance of ray tracing based rendering. In FIG. 2, an example apparatus 39 includes an interface 40, which can be used to interface system 39 with another component. Interface 40 can communicate with a bus 43 that provides a communication path among a processing array 65, a task distributor 50, a packet unit 105 and a plurality of data masters 45-48. Apparatus 39 can interface with (or include) an L1 cache 36, which in turn can communicate with a cache hierarchy 37, and then to a system memory interface 38. A memory interface 66 demarcates a boundary within a memory subsystem of apparatus 39 between register file 25 and L1 cache 36 (in some implementations, L1 cache 36 and register file 25 can be implemented in the same physical memory; memory interface 66 also can identify a boundary between L1 cache 36 and cache hierarchy 37). In the context of a graphics processor, register file 25 represents a first level memory that can serve as sources and destinations for instructions executing on programmable units in clusters 71-74 and also by units 118-120.

Within processing array 65, a set of processing clusters 71-74 may be provided. Each processing cluster may include one or more processing elements that can operate on an independent instruction stream from the other clusters. Each cluster 71-74 also may include a Single Instruction Multiple Data (SIMD) capability. An interconnect 65 couples clusters 71-74 with a set of queues 61-63, each of which serves as a queue for a respective functional unit. In the example of FIG. 2, processing array 65 includes a texture unit 118, which can sample and filter texture data on behalf of processes executing in clusters 71-74, a complex unit 119 which can perform complex mathematical calculations such as transcendental calculations, and a ray tester 120, which can perform intersection testing for a ray with both acceleration structure elements and scene primitives. Register file 25 can be shared among clusters 71-74. Register file 25 serves a first level storage function in a memory hierarchy that can include L1 cache 36, further cache hierarchy 37 and a system memory (interface) 38. In one example, register file 25 can be accessed on an instruction by instruction basis, serving as source and/or destination locations for operands identified in instructions.

The example apparatus 39 also includes various masters that can setup chunks of computation on processing array 65. Such masters include a vertex master 45, a pixel master 46, a compute master 47, and a ray master 48. Vertex master 45 can initiate scheduling of vertex processing jobs on clusters 71-74. Such jobs can include geometry transformations, for example. Pixel master 46 can schedule pixel shading jobs on clusters 71-74. A computer master 47 can schedule vectorized computation on clusters 71-74. A ray master 48 can be responsible for coordinating processing of rays on clusters 71-74. For example, ray master 48 may manage overall usage of apparatus 5 for ray tracing functions, arbitrating among other tasks managed by other masters.

An update unit 150 has one or more ports to register file 25 and interfaces with a queue 81. Queue 81 can receive update requests from a variety of sources, and in this example, such sources include units 118-120. Each of the texture unit 118, complex unit 119, and ray tester 120 may output results of computations preformed, to be returned to a cluster that originated a request for such computation (and more particularly, to be received by a process executable on that cluster, which is to receive such results). Clusters can generate update requests to be performed by update unit 150. These update requests can be generated based on computations that use results returned from units 118-120.

An operation of update unit 150 is described in further detail below. Other functionality that may be included in apparatus 5 is a task distributor function 50, which can serve to allocate discrete computation workloads among clusters 71-74; in some implementations, task distribution also may allocate work directly to units 118-120. An intermediate result aggregator 51 can be provided. Where aggregator 51 is provided, intermediate results of computation tasks that are being scheduled or dispatched for execution as groupings by packet unit 105 can be sent through aggregator 51 to packet unit 105.

Packet unit 105 can then use these intermediate results to update a current status of the workloads and to determine which workloads should next execute concurrently. In one example, an intermediate result can include a next program counter associated with a thread identifier, the next program counter indicating where the identified thread is to continue execution. In another example, an intermediate result can include a result of an intersection test between an identified ray and a shape, such as an acceleration structure element. Packet unit 105 can then use this intermediate result to determine a subsequent shape or shapes to test with that ray. In some implementations, a separate intermediate result aggregator is not provided, and instead these intermediate results can be handled as updates to a memory from which packet unit 105 can read. In some implementations, packet unit 105 can indicate that a given workload is to write out a final result to a memory, e.g., to register file 25, indicating completion of that workload.

In the example apparatus 39, a packet unit 105 operates to define collections of computation tasks that can achieve efficiency by concurrent execution on clusters 71-74. Such efficiency gains can include finding portions of computation that can be executed concurrently, using different data elements, as well as portions of computation that use partially overlapping and disjoint data elements. Apparatus 5 can identify a subtype of computation that will be scheduled using packet unit 105. Other subtypes of computation can be scheduled independently of packet unit 105; for example, packet unit can arbitrate for scheduling of clusters 71-74. In the example of FIG. 2, packet unit 105 includes a collection definer 107 and a ready set 106.

Collection definer 107 operates according to one or more collection defining heuristics. A first order heuristic is that a set of tasks to be executed concurrently requires initial commonality of instructions to be executed (even though at some point, those tasks may have divergent branches of execution). Packet unit 105 also may form collections to be concurrently executed based on commonality of data to be used during such execution. Collection definer 107 can track a pool of tasks that require execution, and apply the scheduling heuristics currently being used to determine a relative order in which the tasks are to be scheduled on clusters 71-74 (tasks can correspond to threads in one implementation and in other implementations multiple tasks may be executed by a thread of computation (a single stream of program instructions)). Ready set 106 can track sets of tasks that have been identified for concurrent execution by collection definer 107. Implementations do not require that collections be identified in advance, but can instead identify collections of tasks that have common execution requirements and/or common data set requirements. Task distributor 50 serves to disperse tasks from a given set of tasks among the clusters 71-74 for execution. In one example, tasks executing on clusters 71-74 can be implemented as respective threads of computation that each reference a (respective) stream of instructions. Such threads can be scheduled on each cluster according to a fine-grained scheduler within each cluster, so that these threads share execution resources. In some examples, threads can be scheduled on an instruction-by-instruction basis.

Figure 3:
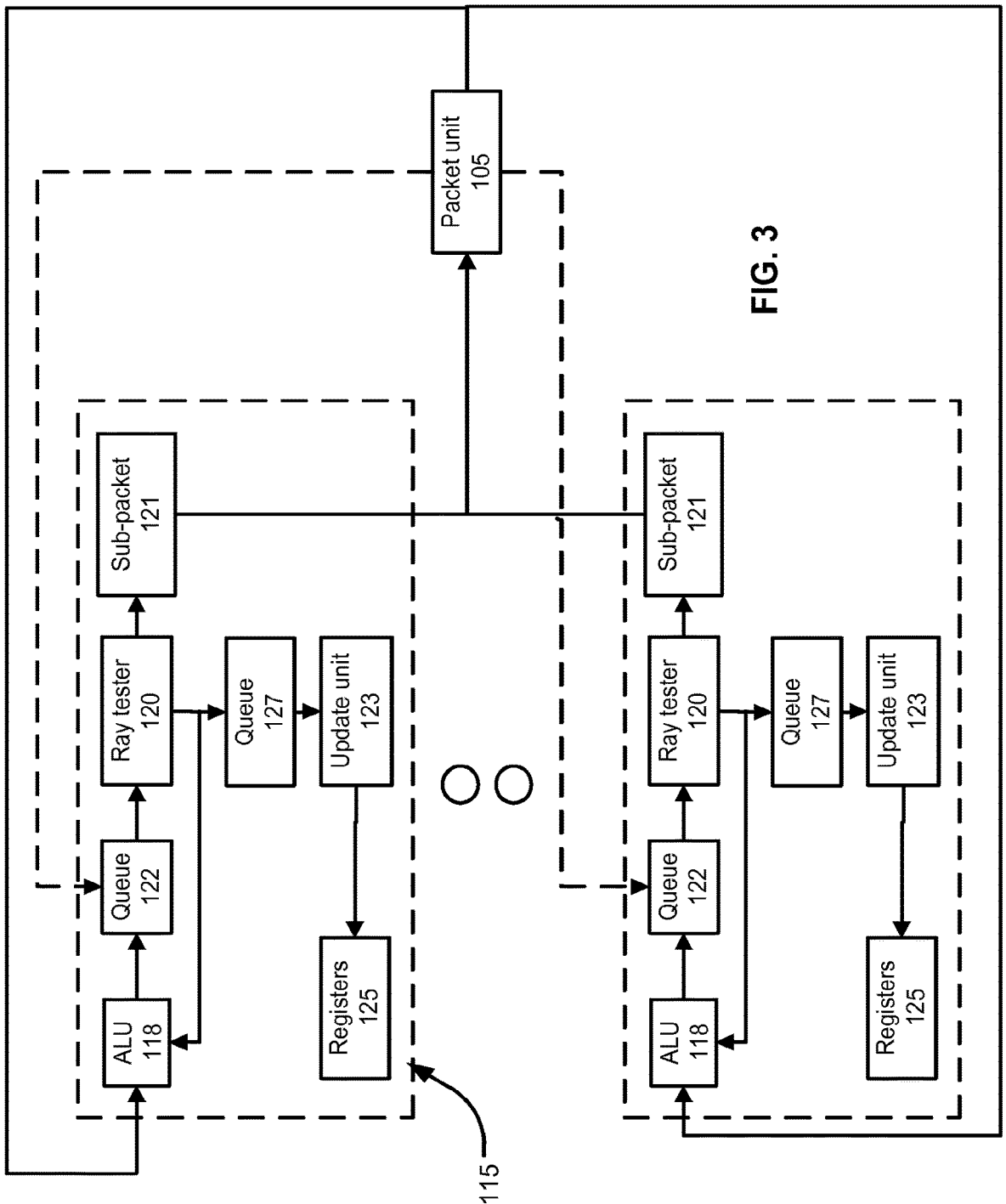
FIG. 3 depicts further aspects of an example implementation of computation units according to the disclosure and other system components.

In a particular example, a thread can generate test operations, represented by operation codes, to be performed by ray tester 120. Such test operations can specify that a ray is to be tested for intersection with an identified shape or group of shapes, for example. In one specific example, as with FIG. 1, a pre-determined set of operations can be represented by a set of operation codes. In the context of 3-D rendering, these operations can include operations to test a single ray with a single shape, to test multiple rays with a single shape, to test multiple shapes with a single ray, multiple rays with multiple shapes, queries of a database of light records, such as identifying the k nearest light records to a locus may be provided. Operation codes also may support specifying a desired summarization or averaging of a set of light records, so that a consistently-sized amount of data can be returned responsive to such an operation code. In the examples of FIG. 1 and FIG. 2, one limited function processing circuit was depicted. However, in some implementations, a desired set of functions to be supported by such a circuit may be subdivided among two or more circuits. A decision concerning how such functions or operations are to be implemented may involve determining how hardware elements can be reused among different subsets of the functions. FIG. 1 and FIG. 2 depict that limited function processing circuits can be used in communication with generally programmable processing units, which can be provided in graphics processing units or FIG. 3 depicts an example implementation of apparatus 39, where a set of computation units can be repeated to form a computation apparatus according to the disclosure. In the example of FIG. 3, each repeated unit (e.g., unit 115) may comprise an Arithmetic Logic Unit (ALU) 118, which can execute programs that can generate ray test requests that are provided to queue 122 that couples to a ray tester 120. In one implementation, ray tester 120 can output results of such tests to selected or multiple destinations. Such destination(s) can be selected based on a type of test that was conducted or a result computed. For example, where a ray test is for an intersection with a primitive, ray tester 120 can output a result of the test to a queue 127 that feeds an update unit 150. In another example, if the test was with an acceleration structure element, then a sub-packet 121 with results of one or more such tests can be formed. For example, sub-packet 121 can be an aggregation point for multiple test results. These sub-packets can be fed to packet unit 105. Packet unit 105 can output groupings of computation to be scheduled for execution on the ALUs of the repeated units. Packet unit 105 also can output computation to be performed by one or more ray testers of the repeated units. Update unit 123 can update a set of registers 125, which are private to unit 115 (not shared with another repeated unit), based on contents obtained from queue 127. Thus, FIGS. 1-2 depict example implementations in which varying numbers of units can be provided that have combinations of local and shared resources. These units can communicate with a packet unit that aggregates results and can dispatch computation for execution to a particular repeated unit, or even a sub-part thereof.

FIG. 4A-4F depicts an example of how programmable computation unit 2 can coordinate the initiation and usage limited function processing circuit 9 (FIG. 1). In one example, programmable computation unit 2 outputs one or more data elements to register file 11 as shown in FIG. 4A; these data elements are to be used by limited function processing circuit 9 during an operation. In FIG. 4B, programmable computation unit 2 also produces an operation code that indicates a selected operation to be performed from a pre-determined set of operations that are supported by circuit 9 and outputs this to buffer 8. This operation code identifies locations in register file 11 containing data to be used in this operation (or explicitly defines data in the operation code, in a circumstance where programmable computation unit 2 did not store the data in register file in advance.)

In FIG. 4C, limited function processing circuit 9 then can access operation codes from buffer 8. In one example, circuit 9 accesses operation codes in first in first out order from a queue implementing buffer 8. In FIG. 4D, circuit 9 then obtains any elements to be used in the operation specified by the operation code from register file 11 and potentially from memory hierarchy 14. However, in some exemplary implementations, access by circuit 9 to memory hierarchy 14 would be impermissible or unsupported, as such access would be expected to incur relatively high and potentially variable latency. In some implementations, programmable computation units 2-3 perform required memory accesses and directly store all data required for a particular operation in the operation code, in register file 11, or a combination thereof. Operation codes also may specify one or more destinations to which results are to be sent, which can include packer 12, register file 11, scheduler 5, a programmable computation unit, and update unit 10 (referencing FIG. 1). FIG. 4E shows an example of circuit 9 outputting a result to register file 11 and an indication of completion to computation unit 2. FIG. 4F shows an example of circuit 9 outputting a result to packer 12. Implementations may provide any subset of these output options for circuit 9 and may have datapath designed to support that subset of output options. Also, a computation model supported by an implementation may influence certain design criteria. For example, a non-blocking computation model may be employed, where a thread that issues an operation code does not include later-occurring data dependencies that require blocking to wait for a result. Instead, result availability can be used to control issuance of an independently scheduled computation. In such a situation, packet unit 13 may receive results and initiate these computations. Where a computation model supports thread blocking, scheduler 5 would swap that thread out and schedule other threads that can be executed. Scheduler 5 may then be provided indications of completion, which would allow scheduler to change a state of a thread that had been blocked waiting on result availability. Then, that thread could access a location in register 11 (for example) where such results were saved. These are examples, and it would be understood that other variations on these techniques and other computation models can be used in implementations of such examples. Also, certain approaches to using implementations of these disclosures may be more efficient for certain workloads than others, and it would be understood that implementations are not required to support a single computation model.

Figures 5A, 5B:
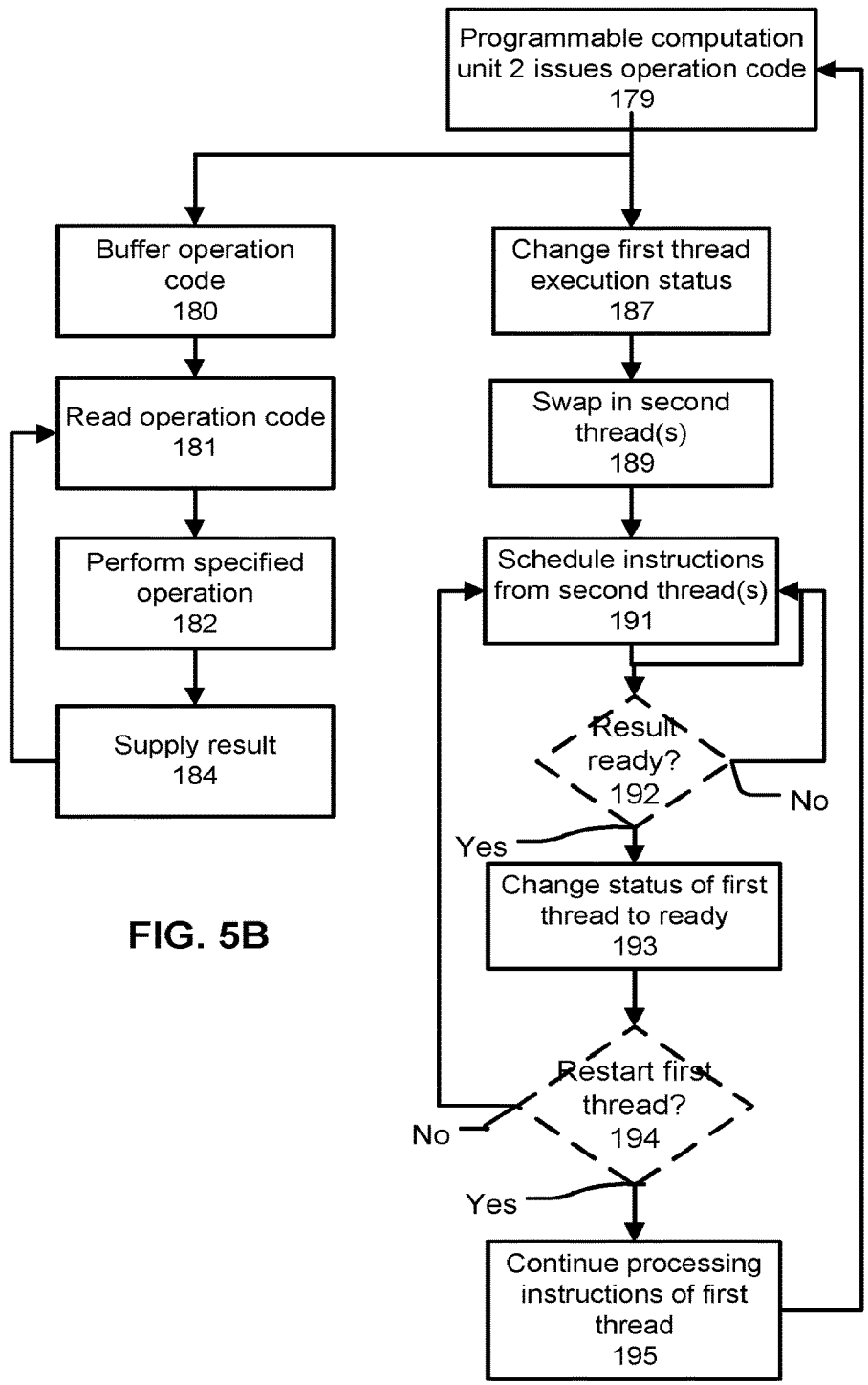
FIGS. 5A-5B depict an example of activating a special purpose logic module using operation codes and aspects of the interoperation of system elements.

FIGS. 5A and 5B provide further detail for an example approach to using circuit 9, in the context of ray tracing. FIG. 5A depicts an example section of code that can be executed by programmable computation unit 2, which can be from a first thread of instructions (e.g., instruction 1, 2, and so on). The instructions include an "if" statement including a Boxtest instruction, which is reached. This Boxtest instruction references a location of an acceleration structure element (a box, such as an axis aligned bounding box, in this example) and a reference to a ray (another example is to directly supply ray data). Referencing FIG. 5B, which shows an example process that can be performed, this Boxtest instruction causes the issue (179) of an operation code to be outputted to buffer 8 which buffers (180), for eventual consumption by circuit 9. The operation code would specify that a box is to be tested for intersection with the referenced (or defined) ray. In FIG. 5A, the thread is shown as blocking to await the result of this box test.

The operation code is read (181) by circuit 9, and the operation specified by the operation code is performed (182) and a result is supplied (184) to one or more destinations, as explained above. The operation code is interpreted used to configure circuit 9 to perform the indicated operation on the indicated data. How circuit 9 is configured to perform the indicated operation may differ depending on implementation. In one approach, circuit 9 includes fixed function circuitry blocks that implement constituent sub-operations of different operations to be supported in circuit 9. For example, circuit 9 may include an adder, divider, multiplication units, shift registers and so on that can be configurably interconnected to support a particular operation. Circuit 9 also may be elements that can be configured and configurably connected, based on stored microcode or other form of configuration data to support a pre-defined set of operations. As such, circuit 9 is not a generally programmable processor, but can instead be optimized to support a range of operations expected to be used for a particular set of tasks. This pre-determined set of operations can be determined during system specification and design, or later, such as incorporating the design into a particular system on chip, or during configuration stage preceding runtime operation.

This portion (181-184) of the depicted process in FIG. 5B can be executed concurrently with the following portion. Since the first thread is to block awaiting the result, a status of the first thread is changed (187) to a block state (e.g., from a running state). Scheduler 5 may swap (189) in one or more second thread(s) (how swapping is implemented may vary among implementations, such as depending on an instruction scheduling model supported). Then, instructions from the second thread(s) are scheduled (191). Availability of the result on which the first thread is blocked can be monitored (192) and responsive to result availability, a status of the first thread can be changed to ready (assuming no other dependencies are unmet). Then, a decision to restart scheduling of instructions from the first thread can be made (194).

Then, a 'HasPrimitives' determination can be made. In an example, this determination is implemented as a function call that executes on the programmable processor. This test would be implemented to determine whether a box is a leaf node that bounds primitives or not. If the box has primitives then, a PrimTestList instruction is reached, which generates an operation code to cause the referenced ray to be tested against a set of primitives referenced for Box A (e.g., stored in a memory location determinable from a location of Box A definition data. Otherwise, BoxTestList instruction is reached, which will generate an operation code to cause the referenced ray to be tested against a set of child acceleration structure elements of Box A. Each of these instructions can be understood to be processed according to an implementation of the example process depicted in FIG. 5B.

FIGS. 5A and 5B thus depict an example in which various portions of a ray tracing process can be implemented using software control, but with accelerated hardware support. The accelerated hardware support is accessible from software by using instructions that are indicative of particular operations. These instructions can be part of an instruction set that is used for software written for the programmable computation units. Examples of other instructions that can be supported by such a limited function circuit 9 include instructions to compare distances between a locus point in 3-D space and other points in the 3-D space, and to return one or more points meeting specified parameters. Such an operation can be used to determine whether specified photons are within a specified maximum radius of a locus, for example. In one sense, circuit 9 can support operations that query a spatial arrangement of a first set of one or more geometry elements with a second set of one or more geometric elements. In some implementations, a decision whether or not an operation may be supported within circuit 9 is made dependent on whether or not the operation can be incorporated into circuit 9 with reuse of existing hardware components or some portion thereof, if logic used to reconfigure the interconnections of these units can support the operation with a desired maximum increase in complexity. These are qualitative design-oriented guidelines that would be understood from the perspective of those of ordinary skill when implementing these disclosures.

Figure 6:
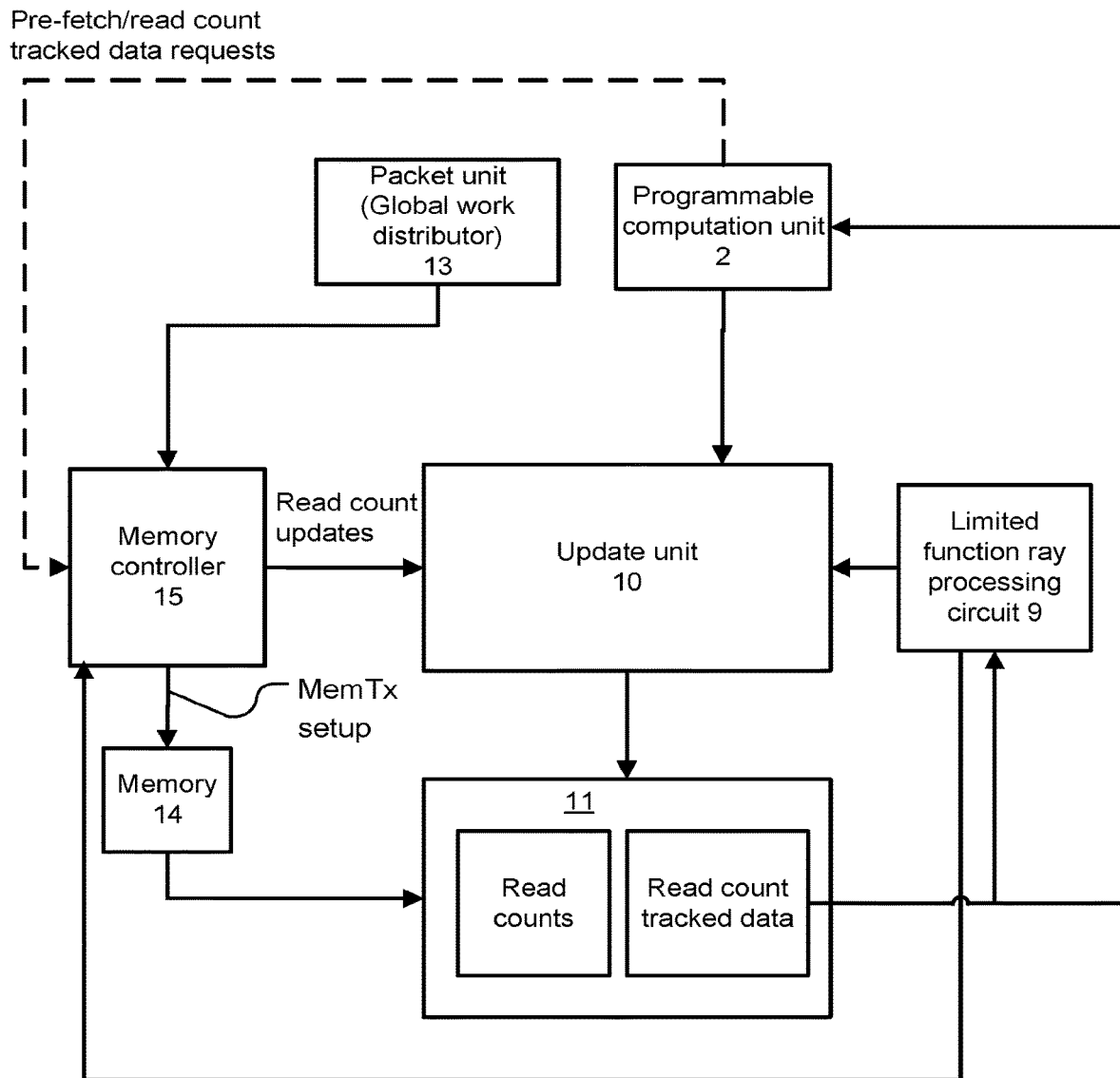
FIG. 6 depicts aspects of an apparatus that includes operational components according to different aspects of the disclosure.

FIGS. 6, and 18-20 depict an overview how system 1 can be used to practice a second aspect of the disclosure. In FIG. 6, packet unit 13 initiates a pre-fetch read request to be made of memory controller 15. In one example, a pre-fetch read request causes memory controller 15 to move data from memory 14 into register file 11 (or into a cache, such as an L2 cache). Packet unit 13 can generate a pre-fetch read request in conjunction with dispatching a group of computation tasks (e.g., new threads) to begin execution on one or more programmable computation units, where tasks of that group will use at least some of the data that is pre-fetched. The request also would include information about a number of individual reads to be made of data in the set. For example, if packet unit 13 makes a packet of 32 tasks, each to use a specific element of data once, then the packet may indicate that 32 reads are to be expected. As explained below, this expected read count is used to control cache eviction behavior. In some implementations, packet unit 13 can dispatch a group of tasks for execution and a first task to be executed from that group, which makes a request of memory controller 15 for a specified data element may provide an indicator of how many other reads are to be expected.

In some implementations, programmable computation units make requests for data that are served through memory controller. In such a circumstance, memory controller 15 can generate updates to read counts maintained for the difference elements of data, for which read counts are being tracked. In other implementations, a memory (e.g., a register file or a cache) that is serving the requested data includes logic that tracks read counts. In some implementations, update unit 10 can maintain these read counts, based on read count updates received by update unit 10, which may come from a variety of different sources. The usage of update unit 10 to maintain these read counts is explained in the context of other usages and operational aspects of update unit 10.

FIG. 7 depicts a first example process by which update unit 150 can effect updates on a memory, such as register file 25, on behalf of computation tasks or other functional units. At 205, a memory map for which update unit 150 has delegated rights is updated or created. In one example, the memory map identifies areas within one or more memories for which update unit 150 will have delegated write privileges. At 207, execution of threads (as an example of tasks to be performed) occurs and such execution generates test operations. At 209, these test operations are enqueued in queue 63. Queue 63 can be identified as a destination for such tasks (and not units 118 or 119 for example), by use of a queue address or other identifier. Thus, in apparatus 5, multiple tasks may be generating test operations to be enqueued in queue 63.

At 213, ray tester 120 produces results of test operations. In an example, ray tester 120 operates serially on tests enqueued in queue 63. Ray tester 120 enqueues update requests based on results of test operations. For example, if ray tester 120 found an intersection between a ray and a given element of geometry, then a closest intersection update operation is enqueued. In an example, a closest intersection update operation is enqueued even though it is not known a-priori whether the intersection found by the test is, in fact, closer than an already-closest intersection found for that ray. For example, ray tester 120 may not read a location in register file 25 in which a current closest intersection is stored for the ray being tested. Even if ray tester 120 were to read such data, ray tester 120 still would have to perform a comparison between a distance of the newly found intersection and the currently-closest intersection. Update unit 150 can test specified condition(s) under which an update is to occur, which can be specified in the update request. Additionally, sources of these update requests can evaluate other conditions prior to enqueuing (deciding to enqueue) an update to update unit.

At 221, update unit 150 retrieves an update request from queue and at 223 evaluates whether conditions specified by the update request indicate that the request can be performed or not. Such conditions can vary with the situation. Evaluating these conditions may require comparing one or more values supplied with the update with stored parameter values. If the update is to be performed, at 229, a check can be made as to whether update unit 150 has been delegated write privileges to locations affected by the update request. The check for delegated write privileges is optional, in that some implementations allow an update unit to write to any memory location. If not, then update unit 150, at 227, can generate a request to lock these locations. If update unit 150 has delegated write privileges, then the update operation can be configured at 233 and performed at 235. At 231, it is determined whether a lock has been obtained, and if so, then the update is configured at 233 and performed at 235. How an update unit obtains a lock is dependent on implementation, in that some implementations may provide a capability to effect writes in single cycle, so that a danger of a unit reading a corrupt, partially written, value is not present, so long as the update unit obtains a lock for the single cycle that it will write.

FIGS. 8A and 8B depict an example flow of control/data in order to implement computation and result updating, according to some aspects of the disclosure. FIG. 4A shows that ray tester 120 outputs results of computations to cluster 71, and then cluster 71 provides update requests to queue 81, for performance by update unit 150. FIG. 8B shows that ray tester 120 outputs update requests directly to queue 81. In the approach of FIG. 8B, ray tester 120 may perform preceding steps (if any) to determine whether to generate an update request, while in FIG. 8A, these may be performed by cluster 71. The approaches of FIGS. 8A and 8B are not in the alternative, and implementations may provide both.

Update unit 150 can be implemented with varying capabilities, each of which would incur different costs or result in different amounts of implementation complexity. FIG. 9A depicts an example of an implementation of update unit 150 that implements a focused set of capabilities. In particular, in FIG. 9A, update unit can perform a defined set of update operations, on a first-in-first-out basis. In one approach, however, these updates may be conditional. In FIG. 9A, a queue receives update requests, which may comprise a value, a location, and operation and one or more conditions. In some implementations, not all of these elements may be present and in some implementations, not all update requests may have all of elements, even though some do. In some implementations, a condition is implied by the value and operation. In one approach, the update requests may be considered to use a pre-defined set of update request formats. These may be provided as part of an instruction set architecture (e.g., a program executing on cluster may issue update request instructions). These update request formats may also be internal, rather than externally exposed. Example operations include test and set, conditional increments and decrements, compare and swap operations.

Although a processor instruction set architecture may provide a compare and swap instruction, for example, a distinction is how such an instruction would be implemented in a typical processor instruction set architecture, compared with apparatuses implementing disclosed aspects of the present update unit 150. Here, the update unit 150 operates on a queue of update requests that may come from a variety of different processors, and effects these updates on a memory on behalf of the processors. As such, these update requests would not be processed through a typical instruction pipeline of the processor. FIG. 9A depicts that a read unit 410 may read a next update from queue 81, parse the various particulars of the update request, and read values from one or more locations specified by the update request. Logic 411 determines the various particulars of the update request, based on the data read and information supplied in the update request. For example, where an update is conditional, logic 411 evaluates the condition(s) and determines whether the update should proceed. A locking unit 412 can obtain a lock on location(s) to be updated and then a write unit 413 can write data to effect the update. Locking unit 412 also may lock a location storing data that is input to a conditional. Locking unit 412 may not be required in some implementations or to be used for all updates, such as where (certain) memory transactions require only a single memory cycle, and where a consistency requirement does not require a specific relative ordering of reads and writes.

Implementations of update units according to the disclosure may provide atomic updating capability between evaluating a condition and writing data to a memory location in dependence on the outcome of the evaluation. For example, update units may process update requests that identify two memory locations, where one of the memory locations includes a data element to be used in a conditional and another of the memory locations is a target for updated data, if the condition evaluates to require updating. In such a circumstance, the read of the conditional location, the evaluation and write back can be atomic, meaning that an inconsistent architectural state is not exposed in the system. Implementations of the disclosure do not require a strong consistency model however. For example, one or more updates may be buffered, which may cause a change to a particular memory location, but a read of a current value of that memory location may be permitted, in some implementations, even though that current value may not be current, in view of the pending updates. This looser consistency memory model may be confined to specific regions in a memory, and update unit may be configured to behave differently for different regions of the memory. For example, update unit 150 may be configured to lock a memory location from being read, search its queue for all updates to that location, and effect all relevant updates before releasing the lock. Different update behaviors may be activated based on different update request types, or based on a region of memory implicated by each update, for example.

Figure 9B:
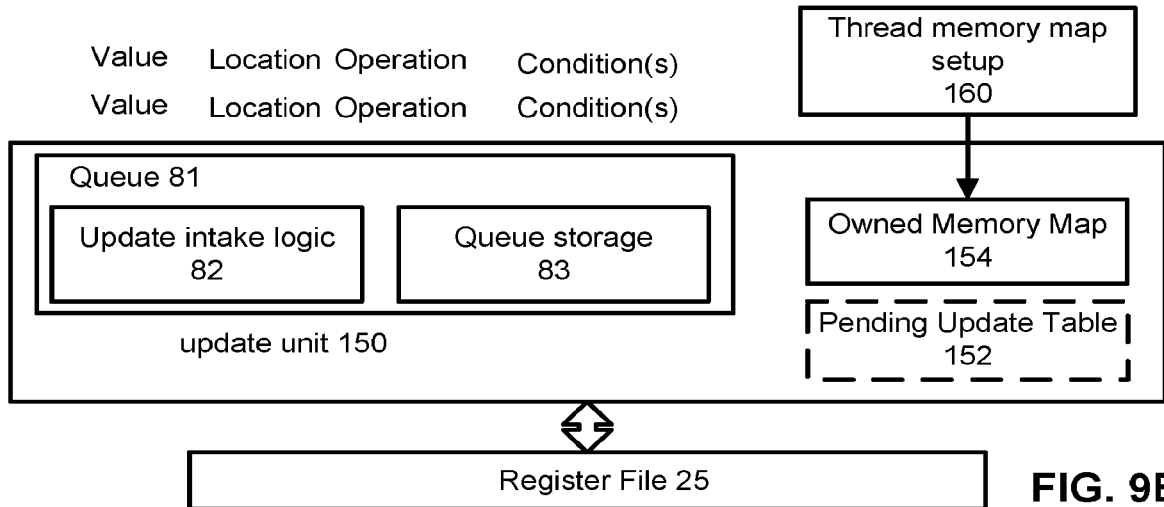

FIG. 9B depicts an example in which an update unit may process update requests out of order. In an example, Queue 81 includes update intake logic 82 that processes an update that was received and after such initial processing, stores that update in update storage 83. Update unit 150 also may include a pending update table 152 and an owned memory map 154 that tracks which regions of memory update unit 150 can update without explicitly arbitrating for access or seeking a lock. This owned memory map 154 can be setup by a thread memory map setup unit 160. Unit 160 can be implemented by a memory controller, or a memory management unit, for example. In FIG. 2, update unit 150 interfaces with register file 25 (or register file 11 of FIG. 1, by further example). However, update unit 150 also can interface with other memories.

Update requests can specify multiple elements to be read and/or written, as part of the condition, and/or as part of the locations to be updated. For example, one location can be updated based on a conditional specifying a comparison of a value with a different memory location. Implementations may restrict a separation of how far these locations are from each other (in virtual or physical memory, depending on memory translation capability supporting update unit 150.)

Some implementations of update unit 150 may support more complex updates requests and/or more complicated processing of such requests. In FIG. 9B, update unit 150 may support out of order completion of updates, collapsing of updates, serialization, maximum latency boundaries, QoS, and priority levels, or some subset of these features. Such update unit 150 also may support different treatment of different subsets of memory locations.

Figure 10:
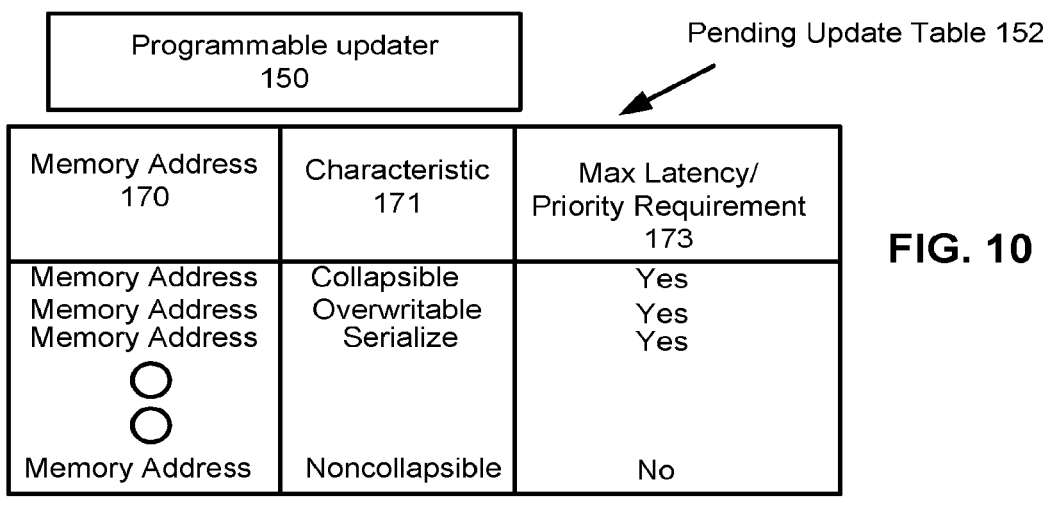
FIG. 10 depicts an example pending update set that may be used in the example of FIG. 9B.

FIG. 10 depicts further details concerning functionality of update unit 150. In the example of FIG. 10 pending update table 152 may be maintained to include information for each update including a memory address 170 to be updated, an update characteristic indicator 171 of such update, and a maximum latency or priority requirement 173. Update characteristic indicator 171 can indicate that the update is collapsible, which refers to whether the update operation can be effected in combination with another update to that address. For example, two or more increment operations can be implemented by collapsing them into one update that has an appropriate increment value. If an update is overwritable, then two updates to the same location occurring at different times can be effected by implementing only the later occurring update. Serialize indicates that the value represented by the update should not be changed or overwritten until it has been used. Updates also can not have any of these special characteristics or may default to one characteristic in the absence of specific information in the update request. In another example, a type of operation represented by the update controls how the update is treated. For example, if tracking a number of references to a ray in different collections being maintained by collection definer 107, then when a ray completes, a decrement operation may be generated. Such operation can be combined with other decrements (and increments) for the same ray. As an example of overwritability, when updating a closest detected intersection distance, earlier occurring updates may be considered overwritable with later-occurring updates. Updates also may require serialization. For example, a serialized update stream can be used to pass data between different functions or execution units, such that subsequent updates are effected after a prior value has been used. Another example update operation is a blend function; for example, a current value and a new value can be given a weighted averaging and written back. Other weighting functions can be applied and can be specified in the update operation itself. As can be evidenced from these examples, update unit 150 may implement a variety of different update operations that may occur for different kinds of application workloads. Although certain update types may not require that a latest value always be written, updates would generally require that a valid (even if not current) value be present in a memory location being updated.

Example conditions that can be imposed on update transactions can include requiring that a value be greater than, less than, equal to, or not equal to a supplied value. Such conditions can include requiring that a supplied reference value be within a range or not within a range, or be in or out of an enumerated set. For example, an update transaction can supplement an enumerated set with another element, if not present in the enumerated set. Multiple conditions can be imposed as alternative or conjoint conditions. Update requests also can be made as a interdependent series of conditional update requests. For example, an outcome of one update request can be a binary value that is preserved for a subsequent update request in the series that can use that binary value in a conditional, and ultimately one or more changes to one or more memory locations can be effected in dependence on the chain of conditionals. Such a series of updates can be used to effect a complex if-then decision statement, where computationally difficult operations can be offloaded to a circuit capable of being configured to efficiently perform such operations.

FIG. 10 also depicts that where updates are to occur to multiple different parts in the same location (e.g., register), updates can be aggregated on that basis (instead of, for example, performing multiple masked writes to that location). Such processing results in final contents for register location 177-178, which will be used to update respective memory locations.

Figure 11:
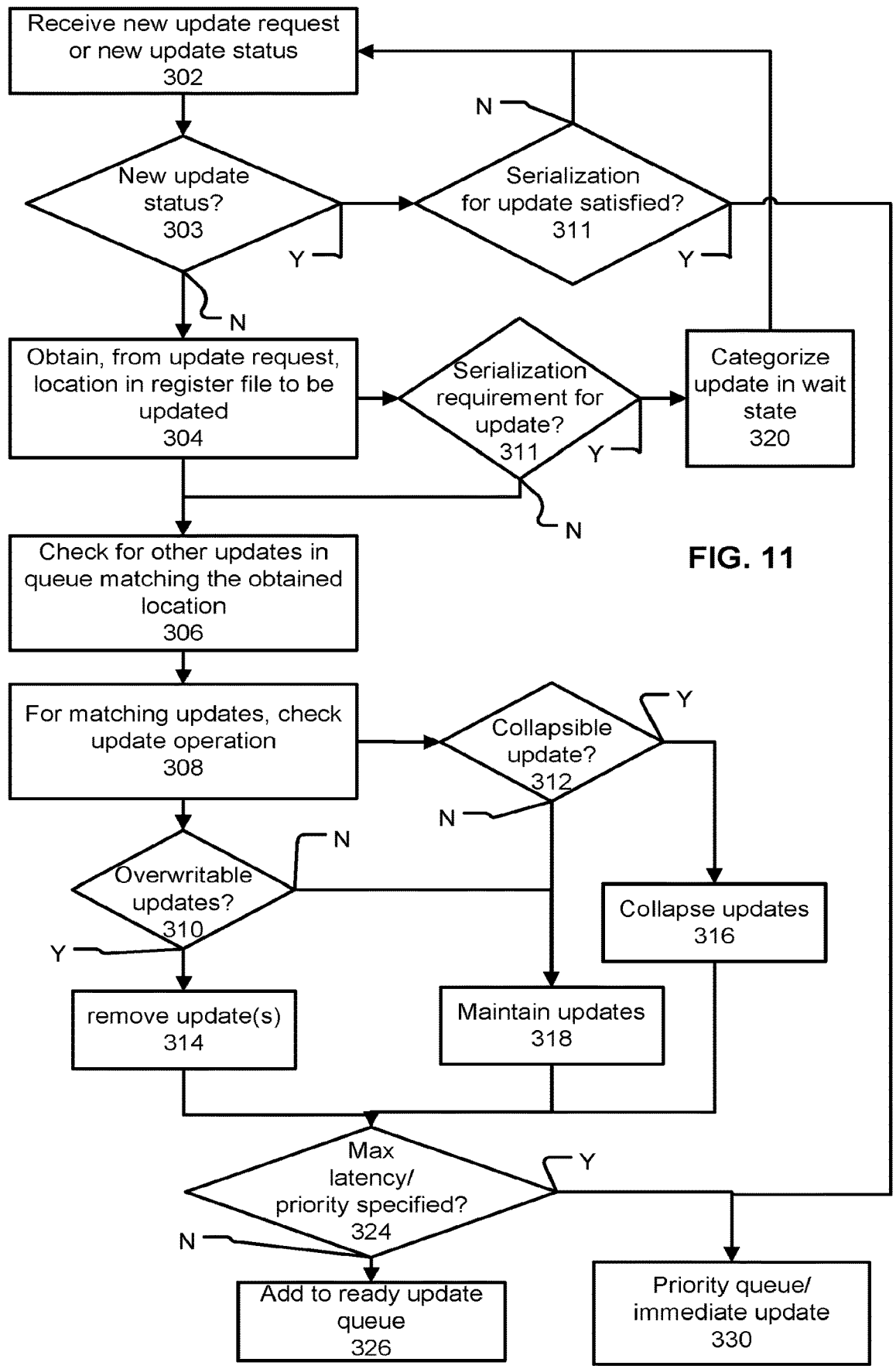
FIG. 11 a further example process of performing updates that can be implemented in apparatuses operating according to the disclosure.

FIG. 11 depicts an example process that can be implemented by update unit 150, in order to provide features in accordance with the above description. At 302, a new update request or status information for a pending update is received. At 303, it is determined whether the received information is status information for a pending update. In the example presented, such status update pertains to whether a serialization requirement for a pending update has been satisfied. In an implementation, serialization effects a requirement that a set of updates be committed in a program order, in that some implementations allow relaxed consistency of updates, rather than requiring a specific order of committal. This is described in further detail below. As such, at 311, it is determined whether the information indicates that the serialization requirement is satisfied. If so, then, at 330, that update can be added to a priority/immediate update queue. Such a priority/immediate update queue can be used to store updates that have elevated priority, or at the minimum have no other conditions to be satisfied before they proceed. If the serialization requirement is not satisfied, then the process can return to 302.

If the information is not for a status update, then in this example, it represents a new update. At 304, a location in a memory (e.g., register file) is obtained from the update. At 311, a determination is made whether the update requires serialization. If so, then that update can be categorized as such and put in a wait state, assuming that the serialization requirement is presently unsatisfied. At 306, a check for other pending updates to the same location is performed. If there are such matching updates, then a determination is made at 312 whether any such updates are collapsible. A determination of collapsibility can use an explicit indicator provided with the updates or can be based on types of operations to be effected by the updates in some implementations. As an example, increment and decrement operations may be collapsible. Update 150 also would need to be implemented to have a capability to represent the range of numbers possible for a maximum number of updates to be collapsed. For example, an increment operation could simply cause an increment by a predetermined number, but if the increment is to be configurable, then the operation would need to support a bit field capable of representing the increment. Logic also is required in update unit 150 to support calculating the increment from the pending updates. Such logic can perform multiple iterations.

At 316, if there are two or more collapsible updates, then these updates are collapsed by determining a value representing a combined effect and setting an update that will to store that determined value. Otherwise, at 318, the updates are maintained. At 310, a determination is made whether the new update may overwrite one or more existing updates. At 314, any updates that may be overwritten can be removed. For example, where two or more updates specify a value to be written to the same location, a sequentially later value may be maintained and an earlier value may be removed. In other implementations, update unit 150 may implement logic to evaluate whether either value meets a criteria better than another, and keep such value. For example, in ray tracing, a closest intersection for a ray with scene geometry may be desired. If two or more primitive intersections for the same ray are identified, then a closer intersection may be identified among these updates. Programmable updating 150 in implementing such closest intersection tracking would read a closest intersection from its storage location and compare it with a value from an update. Logic implementing this also may be used to compare values from multiple pending updates. As such, update unit 150 may operate concurrently on multiple updates that pertain to different operations (e.g., overwrite updates and increment updates may proceed concurrently). Combining updates may be opportunistic, in the sense that it may be confined to situations where an update cannot proceed due to a lock condition, for example.

In the process depicted in FIG. 11, at 324, it can be determined whether the update(s) remaining after the processing described above have a latency or priority requirement specified. Such latency or priority requirement can include specifying a maximum latency or time to completion or a relative priority to other updates. Such latency or priority also can be inferred from a type of update or based on a location being updated. A scheduler can input priority data for certain memory locations for which updates should be prioritized. For example, such a scheduler may have visibility into progress of particular elements of data through an algorithm, or that one or more other processes are waiting on a particular update. Updates that have a relatively high priority or maximum latency requirement may be added, at 330, to priority/immediate queue. As introduced above, an update requiring serialization also may be added to such queue, reflecting a situation that a process may be blocked waiting for such value, and as such, serialization can be viewed as a special example case of an update to be treated differently.

Figure 12:
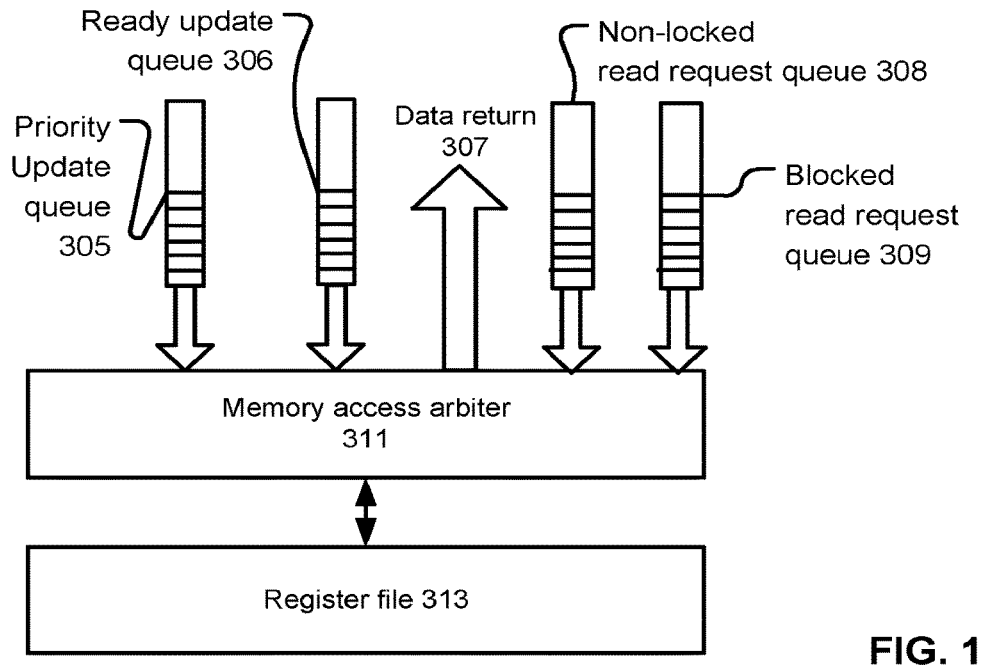
FIG. 12 depicts an example of a set of queues being serviced by a memory arbiter, where at least some of the queues may be populated by an update unit.
Figure 13:
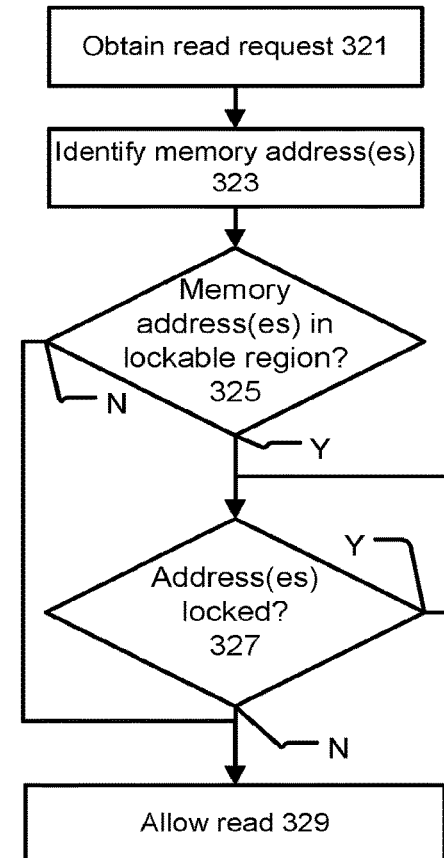
FIG. 13 depicts an example process of servicing read requests when using an update unit according to an example in the disclosure.

FIG. 12 depicts aspects of arbitration for memory access in an implementation according to the above disclosures. In FIG. 12, a register file 313 serves as a memory to be read and updated. Register file 313 has one or more ports through which transactions can be effected. The ports may include one or more bidirectional ports, supporting both read and write transactions. Other implementations may have two or more unidirectional ports. Some implementations may have multiple redundant ports. Some implementations may provide a separate port for each of a plurality of computation units. Arbiter 311 may arbitrate among conflicting accesses to portions of register file 313.

Some implementations may support one or more dedicated ports for each unit connecting to the register file (e.g., each computation unit). However, the example of FIG. 12 is one where arbitration occurs for access through one or more ports shared between update unit 150 and one or more other units (e.g., one or more of clusters 71-74). A memory access arbiter 311 handles this arbitration, from among the example competing demands in FIG. 12. These demands include servicing a priority update queue 305, a ready update queue 306, non-locked read queue 308 and a blocked read request queue 309. This example thus exemplifies a situation where updates occur through the update unit 150, acting on behalf of computation elements, while read transactions are generated directly from the computation elements. Considering FIG. 2 as an example, clusters 71-74 and units 118-120 all may delegate certain write transactions to update unit 150.

Continuing with the example of FIG. 12, a priority update queue 305, and a ready update queue 306 represent two different sources of updates to be made to register file 313. Each of these queues are fed by logic in update unit 150 that can overwrite or collapse updates, as well as verify conditions precedent to readiness for the update to be made. As such, these queues represent updates that are all ready to be made, but have different priorities, and these queues can thus be implemented by a mechanism that allows relative prioritization, and no requirement for physically or logically separate queues is implicit.

Non-locked read queue 308 and blocked read request queue 309 respectively store requests that can be serviced without checking on a lock condition of a location being read, and requests that are blocked for some reason, such as waiting for completion of a transaction or release of a lock. Non-locked read queue can store reads from locations that store values used in a type of computation that will ultimately reach a correct result, even if intermediate results are used or returned out of sequence. For example, a closest intersection for a ray can be read through an unlocked read request—unlocked here meaning that there is no hold placed on the location when an update is pending, that a determination is made as to whether update queues (e.g., queues 306 or 307) contain an update for that location, or that a computation unit may be preforming computation that may ultimately produce an update for that location, or some combination thereof.

If such a closest ray intersection is read in such a manner, there may be situations where a pending update to the closest intersection distance would have obviated a need to perform a given intersection test (where a primitive being tested lies between the previous closest intersection and the intersection distance waiting to be written). However, ultimately, a closest intersection distance for the ray will converge to the correct result, since that intersection test will produce an intersection distance that will generate an update, which will cause update unit 150 to compare a current closest intersection distance (which may have been updated with the then-pending closer distance), and updated in dependence on that comparison. More trivial examples of non-locked read requests include reads to areas of memory known to store static values (static applying to a given computation context, which may change over time), such as a definition of a ray or an acceleration structure element.

Potential write after write hazards to these locations are addressed by the delegation of updating responsibilities to update unit 150, such that multiple independent actors will not, in normal program execution be writing to these locations. In some implementations, such as when update unit 150 is used to update a cache, or when processes make update requests in a virtualized address space, additional write protections may be provided within a Memory Management Unit (MMU). For example, an MMU may enforce read and write positions and perform address transaction functions. For example, update transactions may include a process identifier, which can be presented to the MMU by the update unit 150, and the MMU can use this process identifier to verify write permissions. However, in the context of a register file, it may be undesirable to provide such process-specific memory protection.

Figure 15:
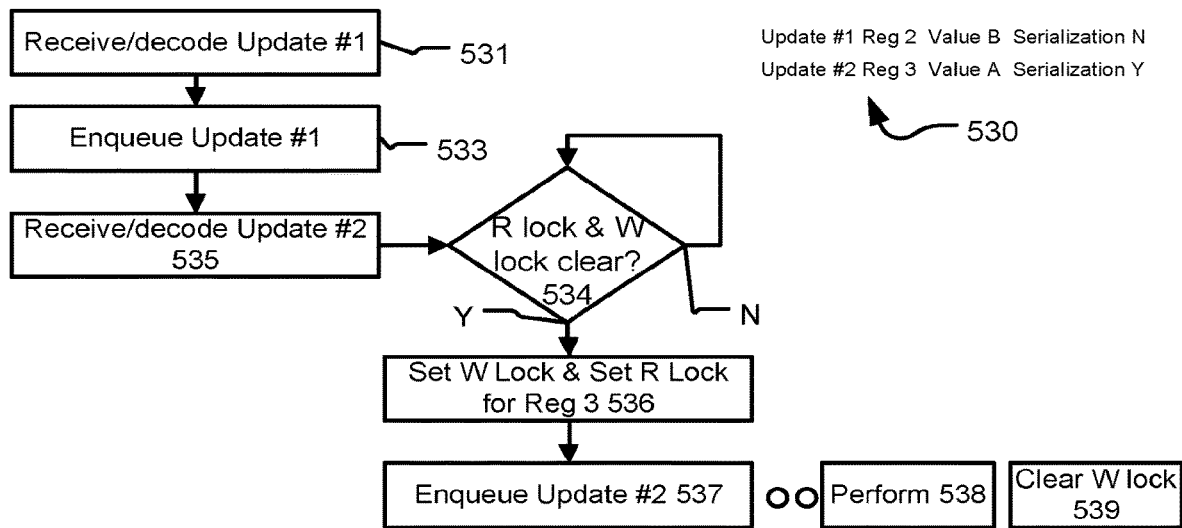
FIGS. 15 and 16 depict example processes which can be implemented for serializing updates according to the disclosure.

FIG. 15 depicts a process flow by which read requests from blocked read request queue 109 can be serviced; FIG. 9 serves as an example of serving blocked requests due to a memory lock. However, read requests may be blocked for different reasons. One such reason may be that reading from a memory location is to be serialized, and a current value already has been read, while a new value has not yet been stored in that location, but awaits storage in the update queue. FIG. 15 also shows an example where a unitary queue may be implemented for locked and unlocked read requests. At 321, a read request is obtained and at 323 a memory address to be read is identified. At 325, a determination as to whether the memory address is in a lockable region is made, and if it is, then at 327 a check is made as to whether the address currently is locked. If the address is not locked or the address is not in a lockable region, then at 329, the read is allowed. If the address is locked, then the determination at 327 can be repeated, such as on an interval. Alternatively, release of locks can be signaled, and responsive to signaling completion of the present lock, the read may be allowed at 329. Where a given read cannot proceed, a next read in the queue that can proceed may be initiated. Throughput of the read queues can be monitored to reduce or avoid imbalances and to maintain a diversity of types of work capable of executing on the computation units. Memory access arbiter 311 can examine read requests in advance to determine an alternate read request that can execute, if a primary read request ends up being unable to proceed.

Thus, the above disclosure related to aspects of a computation architecture in which a configurable special purpose ray test unit can be implemented. This unit can be fed by a queue that is populated from computation units that generate ray test requests. This unit can output results as update requests to be effected in memory. Data responsive to the read requests (from either queue) are shown as being returned through a data return 307. Such data return 307 can be implemented as a bus or point to point connections or a combination thereof.

Figure 14:
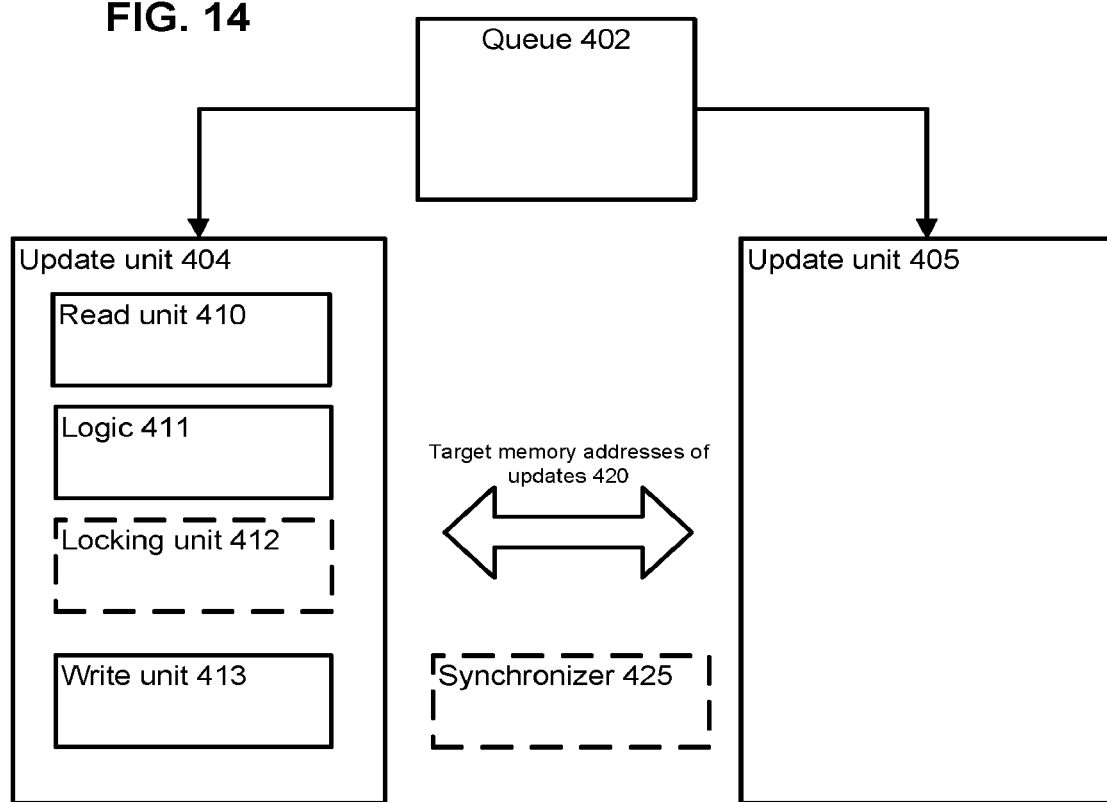
FIG. 14 depicts an example implementation of an update unit formed from multiple operational elements.

FIG. 14 depicts an example where update unit 150 can be implemented by a plurality of operational units. In an example, a queue 402 can be read by update unit 404 and update unit 405. Update unit 404 may comprise a read unit configured to read data describing an update request from queue 402, and logic 411 to evaluate whether an update is to be made or not (updates do not have to be conditional). In some implementations, update unit 404 can include a lock unit 412 configured for obtaining a lock on one or more locations in a memory to be updated. Unit 404 also comprises a write unit 413 for committing the update to the appropriate memory location. In one example, each update unit can exchange addresses that are currently locked by either unit for updating. A synchronizer 425 may be provided, that may control which update requests are serviced by which update unit. As an example, an update unit can be provisioned according to an expected or detected update pattern. For example, one update unit may handle all updates to a particular area of memory, or on a particular pattern of memory accesses, or particular conditional updates (e.g., test and set, versus increment).

FIG. 15 depicts an example of processing updates transactions. In FIG. 15, a set of update transactions 530 includes two update transactions. Update transaction 1 updates register 2, with a value B, and does not require serialization, and update transaction 2 updates register 3 with a value A and requires serialization. At 531, update transaction 1 is received and decoded; since the transaction is not serialized and contains no conditions. At 533, Update transaction 1 can be enqueued. At 535, update transaction 2 is received and decoded. Here, since serialization is specified for this update, a determination whether both a read lock bit and a write lock bit are cleared for register 3. If both read and write locks are cleared then, at 536, both the read lock bit and the write lock bit are set and at 537 update 2 is enqueued. Subsequently (potentially, with variable latency), update 2 is performed and the write lock bit is cleared at 539. FIG. 8 thus represents an updating mechanism.

Figure 16:
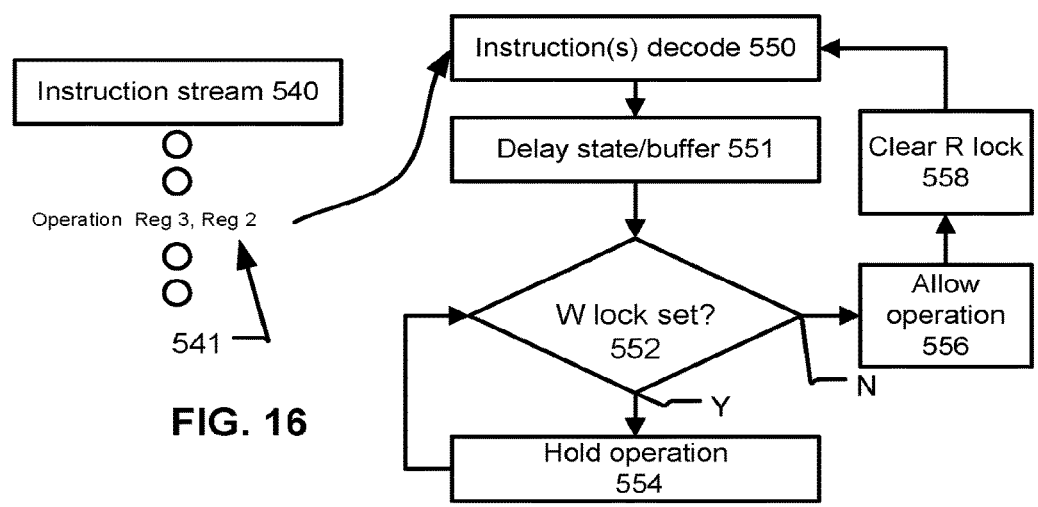

FIG. 16 depicts a counterpart reading mechanism. In FIG. 15, an instruction stream 540 includes instructions to implement an operation 541 that involves registers 2 and 3. As discussed above, register 3 had an update transaction pending that required serialization. At 550, instruction(s) representing operation 541 are decoded. Decoding at 550 identifies registers implicated in operation 541. Then, a delay or wait state is entered at 551. The delay state is selected according to a number of clock events required for the lock events at 536 to be effected. For example, if Update transaction 2 is output on one clock, and is received and decoded by update unit 150 on a subsequent clock, then the delay state may last one clock, so that if operation 541 issues on the same clock as Update transaction 2, the lock event from Update transaction 2 will be visible within one clock, allowing operation 541 to be delayed based on the presence of the lock and avoiding a hazard where a read is processed before a prior issued update is effected (since this is a serialized transaction). At 552, a determination whether the write lock is set. If so, then at 554, operation 541 is not permitted (where the operation includes usage of a value from register 3). If the write lock is not set, then, at 556, operation 541 is allowed. After 556, the read lock is cleared at 558. The process may return to 550 for further operation decoding. Some implementations may provide a queue for operations being held. The queue maintains a relative order of the read transactions. The usage of the write lock thus prevents reading the data before the last write by update unit 150 has been effected. The usage of the read lock prevents update unit 150 from overwriting a value that has not yet been used in an operation. Each of the write and read locks can be implemented by a bit that is set and cleared according to the disclosure. These bits can be implemented in a packed register with other lock bits or appended to individual registers. Status of the lock bits can be used to select update operations and operations that read data from serialized locations, so that associated computation can proceed.

Figure 17:
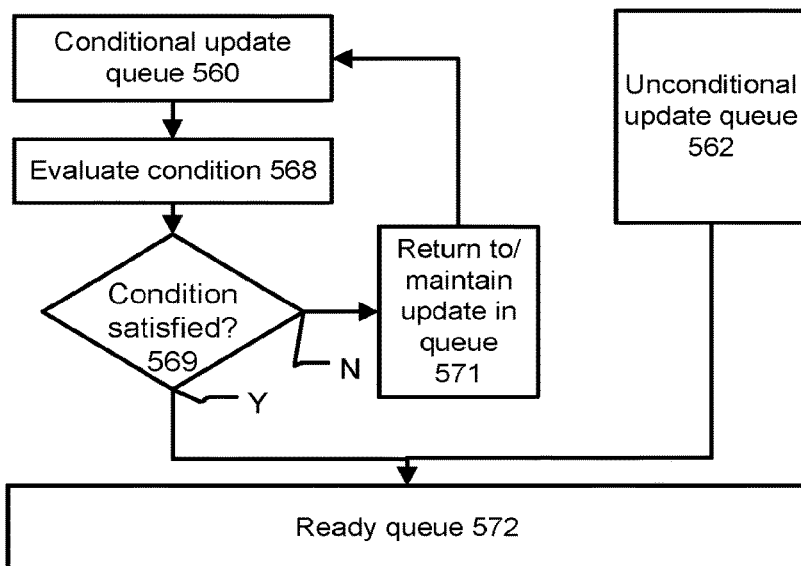
FIG. 17 depicts an example update unit that can have conditional and non-condition update queues.

FIG. 17 depicts an example where updates can be queued based on whether or not they are conditional and processed accordingly. In FIG. 17, a conditional update queue 560 holds updates for which a condition is required to be met before the update is to be performed. At 568, the condition is evaluated and at 569, if the condition is satisfied, then the update is put into a ready queue 572. Otherwise, at 571, the update is returned to or maintained in the conditional update queue. An unconditional update queue directly interfaces with ready queue 562. While conditional update queue 560 may maintain updates for a relatively long period of time, unconditional update queue may advance an update to ready queue 572 quickly. Ready queue 572 can implement ready update queue 306 of FIG. 12.

Figure 18:
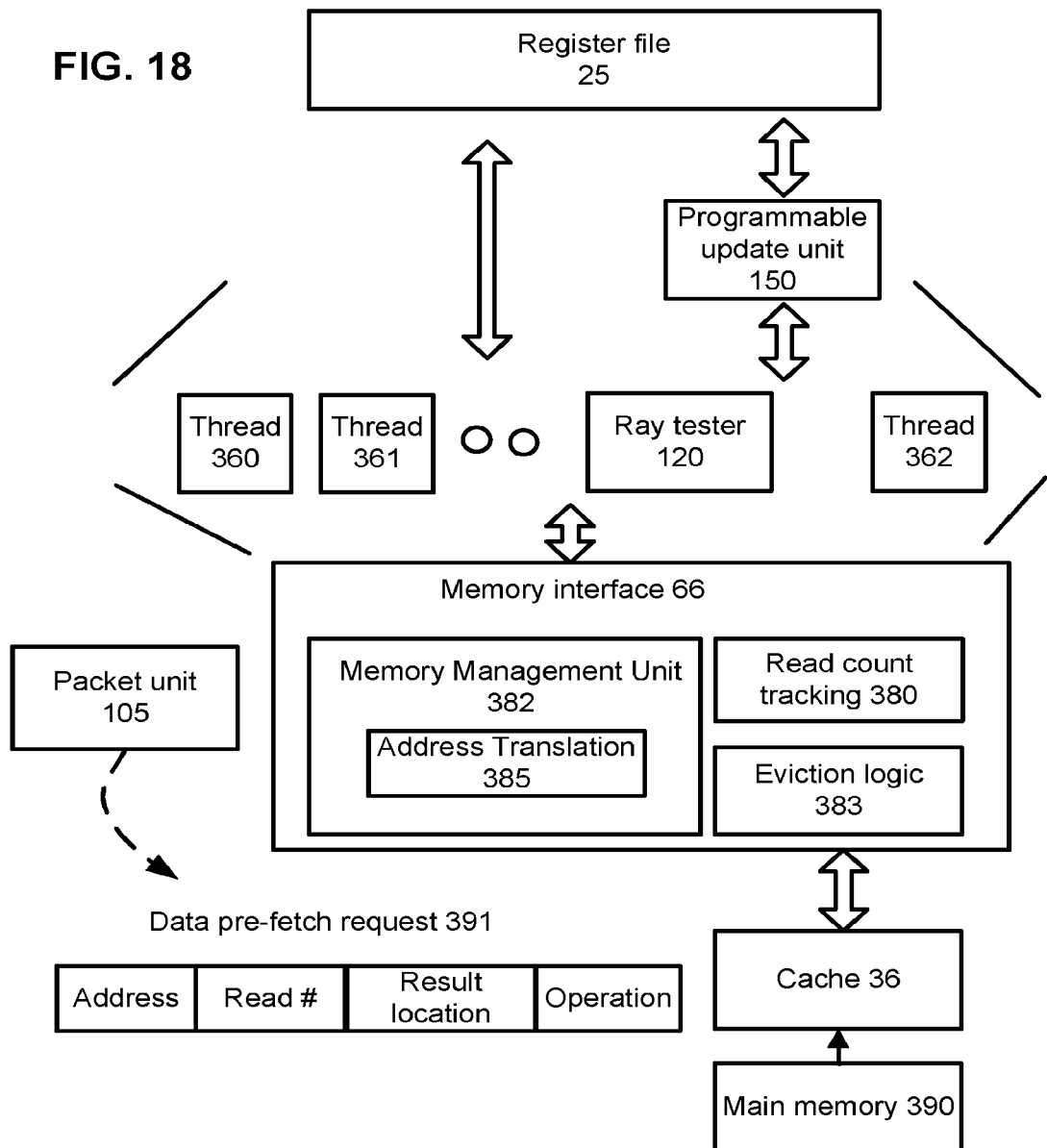
FIG. 18 depicts exemplary structure that can issue prefetched read requests that have expected read counts and perform allocation and management of a memory hierarchy using such expected read counts.

FIG. 18 depicts a further technology that can be implemented in computation architectures according to the disclosure. In FIG. 18, computation elements (e.g., threads 360-362 and special purpose unit 364) or control components (e.g., packet unit 105) can generate data pre-fetch requests (e.g., request 391), which can be directed to a memory subsystem. Each pre-fetch request can specify one or more addresses from which data is to be fetched and an expected number of times that data will be used or read. In some implementations, such a pre-fetch request can be bundled with information describing processing that will occur with that pre-fetched data, such as an operation to be performed and a location at which results may be stored. Such pre-fetch requests are used for advancing specified data from a more remote level (relative to the computation unit using the data) of a memory hierarchy to a less-remote level of the memory hierarchy (e.g., from a main memory to a cache). In many typical computation systems, data is retrieved from a remote memory in response to a cache miss, which is caused by an instruction being executed that uses such data as an operand. Here, however, data is indicated as being required for use at a time in the future. Also, computation units or processes that may use the data are not necessarily specified by the pre-fetch request itself. For example, packet unit 105 can dispatch a pre-fetch request, and threads executing on dispersed computation units may ultimately read and use the pre-fetched data; such usage can be dispersed over time.

In FIG. 18, a pre-fetch request can cause specified data to be promoted from main memory 390 to cache 36. Memory interface 66 can contain a memory management unit 382 and control access to cache 36. Cache 36 can be an n-way interleaved cache. Memory management unit 382 may include an address translator for supporting virtual memory. Memory interface 66 also includes ray count tracking 380 and eviction logic 383. Read count tracking 380 tracks counts of reads to memory locations within cache 15. In some implementations, read count tracking tracks read counts only for locations in cache 36 that are populated based on pre-fetch requests. Eviction logic 383 uses read counts from read count tracking 380 and expected total reads for different of the locations in cache 36 (originating from pre-fetch requests, for example) as a factor in determining cache lines to evict. An instruction set architecture may provide an instruction for a count-tracked pre-fetch read. This instruction would cause a cache to treat this data, for purposes of cache management, differently than normal cached reads. Such data also could be stored in a particular segment (virtual or physical) of memory treated differently than a normal cache-managed region. Some implementations may allow special purpose units also to initiate read-count tracked pre-fetch reads (e.g., ray tester 120).

Functional elements (e.g., threads 360-362 and ray tester 120) can specify a number of reads that a single physical read represents. For example, a packet unit 105 may indicate that a given acceleration structure element is expected to be read 20 times in testing that shape for intersection with 20 different rays. However, thread 360 may execute on a 4-wide SIMD machine to test 4 different rays for intersection with the shape. Thus, this read should be credited as 4 reads. In this example, read count tracking 380 also can be incremented based on additional pre-fetch requests. For example, packet unit 105 can determine another set of rays to test for intersection with the same shape, and dispatch a second pre-fetch request with a count of rays in that set. The shape may already be in cache 15, and would not need to be re-loaded. A remaining count from the prior pre-fetch request can be added to the count for the next set of rays. Read counts can be represented as individual data elements that can be read from the queue. Read counts also can be represented within read count tracking 380 on a cache line basis. For example, where data elements are packed into a cache line, a convention needs to be established so that the read does not count against a data element that will not be used for that read. Such convention can use a masked read, or explicitly indicate which data element the read pertains to. Some implementations may attempt to aggregate reads to the same cache line and the convention may be that the read applies to all data elements unless indicated otherwise. These options are exemplary and other approaches to tracking read counts on an element-by-element basis or cache line basis may be implemented.

In some implementations, update unit 150 may be used to update tracked read counts. For example, an update request can also specify a read count update to be made, based on processing conducted to produce the update. The pre-fetch requests disclosed herein also may be used to promote data from cache 15 to register file 25, and read counts can be maintained within portions of the register file.

Figure 19:
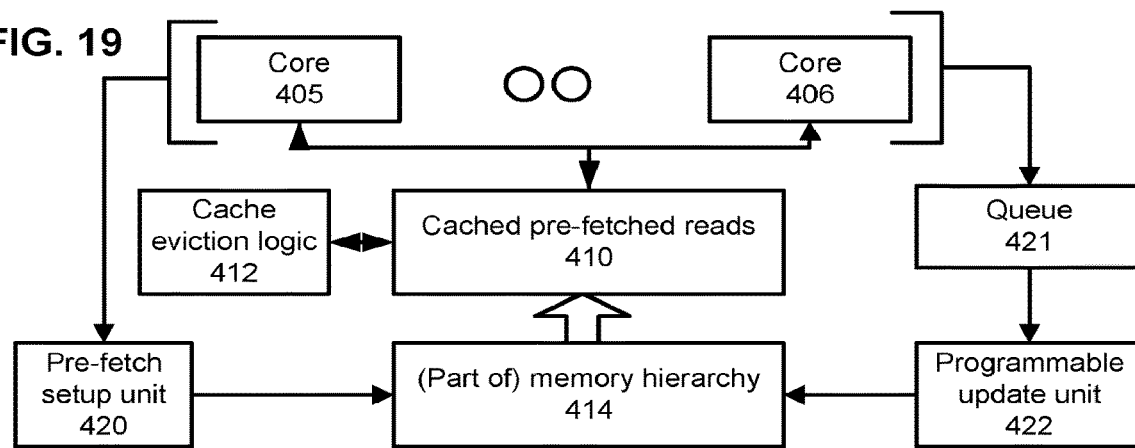
FIG. 19 depicts an exemplary block diagram of a computation apparatus in which pre-fetch read requests according to the disclosure can be implemented.

FIG. 19 depicts an example block diagram of a multicore computation apparatus that uses cached pre-fetch reads with eviction logic using count estimates, and an update unit. Computation apparatuses according to the disclosure may use only one of these technologies. FIG. 19 depicts cores 405-406 that can use cached pre-fetched read data 410. Data stored in cached pre-fetched reads 410 comes from memory hierarchy 414 under control of pre-fetch setup unit 420. An update unit 422 couples with a queue to receive update requests to be made within memory hierarchy 414. Cache eviction logic 412 determines cache lines to evict.

Figure 20:
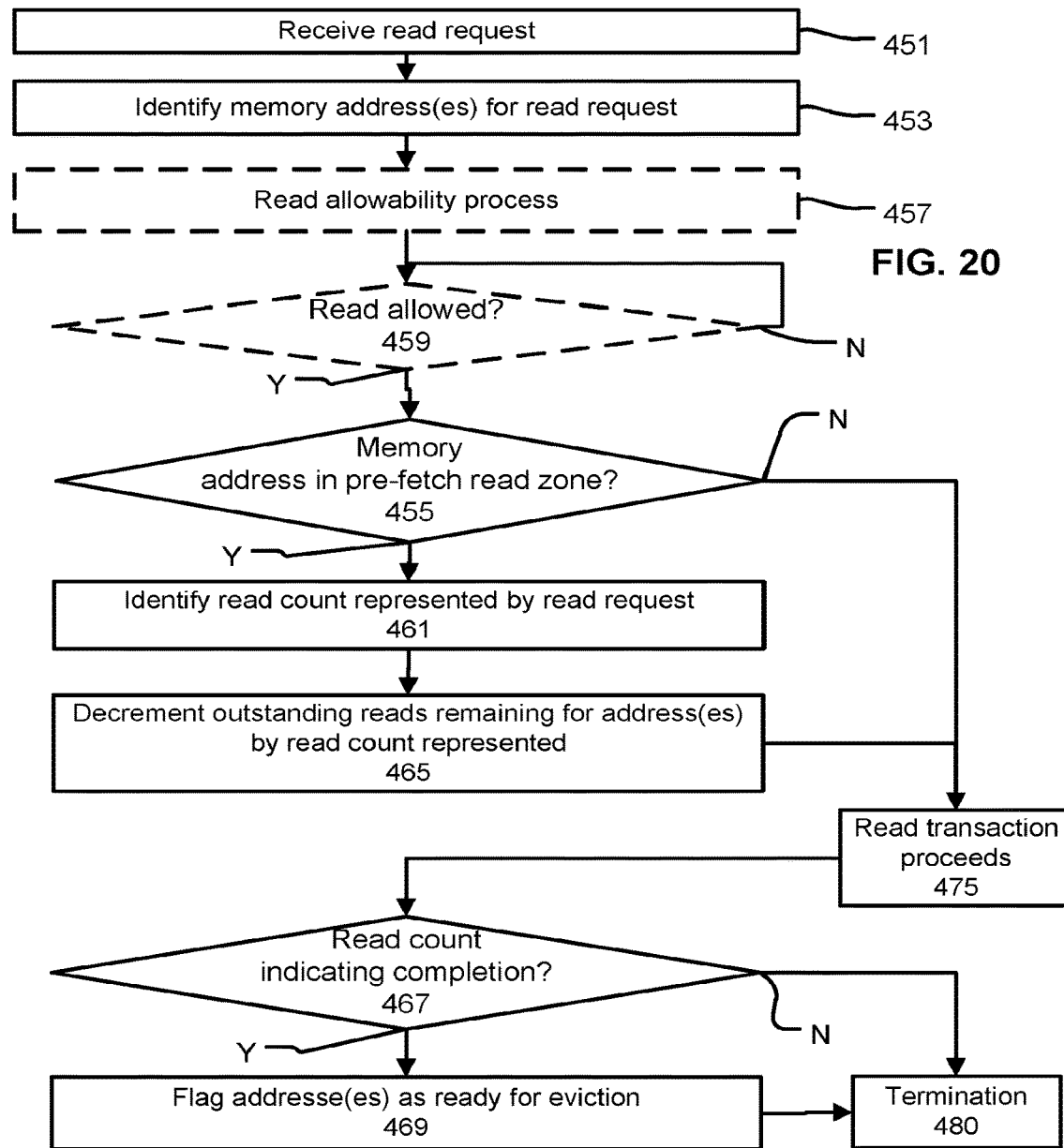
FIG. 20 depicts an example process of pre-fetched reads and memory hierarchy management according to the disclosure.

FIG. 20 depicts an example process in which an implementation of the pre-fetched read disclosures herein can be made. At 451, a read request is received and at 453 memory addresses are identified for the read request. Optionally, a read allowability process can be instituted at 457 (such as checking for a lock on the location). If a read is allowed at 459 then at 455 a check can be made as to whether the memory is a pre-fetch read request location. If a read is not allowed, the process can wait until it is. Reads also may be deferred in some implementations. If the read can proceed and is in a pre-fetch read location, then a read count can be identified at 461 and decremented at 465. The decrementing can be based on an amount of reads that the specific read represents, as explained above. At 475, the read count can proceed. At 467, if a read count indicates completion, then associated location(s) can be flagged as eviction candidates, and at 480, the process can terminate. If the read count does not indicate completion, then the process can terminate at 480.

For clarity in description, data for a certain type of object, e.g., a primitive (e.g., coordinates for three vertices of a triangle) often is described simply as the object itself, rather than referring to the data for the object. For example, if referring to "fetching a primitive", it is to be understood that data representative of that primitive is being fetched.

Representing realistic and finely detailed objects in the 3-D scene is usually done by providing a large number of planar geometric primitives that approximate a surface of the object (i.e., a wire frame model). As such, a more intricate object may need to be represented with more primitives and smaller primitives than a simpler object. Although providing a benefit of higher resolution, performing intersection tests between rays and larger numbers of primitives (as described above, and as will be described further below) is computationally intensive, especially since a complex scene may have many objects. Also, storage requirements increase as the number of primitives used to represent an object increases.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming were explained, as well as examples how such hardware/software can intercommunicate. These examples of hardware or hardware configured with software and such communications interfaces provide means for accomplishing the functions attributed to each of them. For example, a means for performing implementations of software processes described herein includes machine executable code used to configure a machine to perform such process. Some aspects of the disclosure pertain to processes carried out by limited configurability or fixed function circuits and in such situations, means for performing such processes include one or more of special purpose and limited-programmability hardware. Such hardware can be controlled or invoked by software executing on a general purpose computer. Combinations of software and hardware may be provided as a system to interface with software provided by third parties. Such third party software may be written to use a programming semantic specified by the API, which may provide specified built-in functions or provide a library of techniques that may be used during ray tracing based rendering.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. For example, an "update unit" refers to circuitry implementing aspects of updating according to the disclosure. The description explicates that in some aspects, such update unit, and hence circuitry implementing such update unit, supports specified kinds of update requests, which can vary among different implementations. Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, microelectrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented.

In some situations, circuitry and functional modules may be described partially in functional terms, and partially in structural terms. In some situations, the structural portion of such a description may be described in terms of a configuration applied to circuitry or to functional modules, or both.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A machine-implemented method of updating a memory, comprising:
   queuing, by a queue, a request from a computation unit to update a memory, the queue coupled to receive requests from a plurality of computation units each having an instruction pipeline associated therewith;
   receiving, by an update unit from the queue, the request to update the memory, wherein the update unit acts on behalf of the plurality of computational units to perform memory updates such that said memory updates are performed outside an instruction pipeline of each of the plurality of computation units, the request including a first value to be used to update a specified location in the memory and a condition to be satisfied in order for the first value to be used to update the specified location in the memory, the condition comprising a reference to a second location in the memory, and a criterion to be satisfied by a value in the second location in the memory;
   accessing, by the update unit, the second location in the memory; and
   determining, by the update unit, whether the value in the second location in the memory satisfies the criterion, and if so, then using, by the update unit, the first value to update the specified location in the memory atomically;
   wherein atomically comprises that the value in the specified location in the memory is not changed between when the update unit accesses the value in the second location in the memory and when the update unit updates the specified location in the memory using the first value.

2. The machine-implemented method of updating a memory of claim 1, further comprising:
   creating a memory map identifying areas within the memory for which the update unit will have delegated write privileges,
   wherein a check is made as to whether the update unit has been delegated write privileges to locations affected by the update request before using the first value to update the specified location in the memory.

3. The machine-implemented method of updating a memory of claim 1, further comprising performing, in the computation unit, a test to determine whether a ray intersects a shape, and in response to determining that the ray intersects the shape, generating the request to include a distance to the intersection, and a location at which is stored a current closest intersection found for the ray, wherein the update unit is configured to use the location at which is stored a current closest intersection and compare the value in that location with the included distance to determine whether to update that location with the distance included with the request.

4. An apparatus for concurrent computation, comprising:
   a plurality of computation cores, each having an instruction pipeline associated therewith;
   a memory; and
   an update unit that acts on behalf of the plurality of computation cores to perform memory updates such that said memory updates are performed outside an instruction pipeline of each of the plurality of computation cores; wherein
   the plurality of computation cores are coupled to the update unit through an interconnect, each computation core capable of
      executing a sequence of instructions, and which are operable to output update requests to a queue for receiving by the update unit under control of the sequence of instructions,
      the update requests outputted to change data stored in portions of the memory to which the sequence of instructions has write permissions, each update request including a first value to be used to update a specified location in the memory and a condition to be satisfied in order for the first value to be used to update the specified location in the memory, the condition comprising a reference to a second location in the memory, and a criterion to be satisfied by a value in the second location in the memory,
   wherein the update unit is configured to initiate and complete each update request atomically, comprising that the value in the second location in the memory is not changed between when the update unit accesses the value in the second location in the memory and when the update unit updates the first value to the specified location in the memory.

5. The apparatus for concurrent computation of claim 4, further comprising a buffer for temporarily storing update requests outputted from the plurality of computation cores, the buffer coupled to be read by the update unit.

6. The apparatus for concurrent computation of claim 5, wherein the update unit is configured for identifying a location for which a plurality of updates are pending in the buffer and determining whether that plurality of updates can be applied to the location in fewer discrete updates.

7. The apparatus for concurrent computation of claim 4, wherein the sequence of instructions is operable to configure the plurality of computation cores to issue an offload transaction, the offload transaction to be serviced by a special-purpose processing unit, and wherein the special-purpose processing unit is configured to effect changes to the memory, using the update unit.

8. The apparatus for concurrent computation of claim 4, wherein the update unit is configured to effect updates according to a pre-determined set of update types.

9. The apparatus for concurrent computation of claim 8, wherein the set of update types comprises a compare and set operation that specifies that the criterion includes a comparison between a value included with the compare and set operation and the value in the first memory location, and a second memory location that is an update target, dependent on an outcome of the comparison.

10. The apparatus for concurrent computation of claim 8, wherein the set of update types comprises a compare and set operation, and the update unit is operable to identify a plurality of compare and set operations, specified in pending update requests, to the same location in the memory, and to collapse those compare and set operations based on sequence information associated with that location in memory.

11. The apparatus for concurrent computation of claim 4, wherein at least some of the update requests are associated with sequence information, from which a relative ordering of update requests for the same memory location can be determined.

12. The apparatus for concurrent computation of claim 4, further comprising a memory controller unit coupled to the memory and configured to control access to the memory and to allow read transactions from a portion of the memory for which write responsibility has been delegated to the update unit, without determining whether there is a pending update transaction that affects that portion of the memory.

13. The apparatus for concurrent computation of claim 12, wherein the memory controller unit is further configured to provide a capability for threads of computation executing on the plurality of computation units to obtain a lock on a region of memory for which write responsibility has not been allocated to the update unit.

14. The apparatus for concurrent computation of claim 4, wherein the update unit is configured to combine multiple updates to the same memory location by determining a combined effect of the multiple updates and updating that memory location with data representing the combined effect.

15. The apparatus for concurrent computation of claim 4, wherein the update unit is configured to support a serialization requirement for an update transaction, the serialization requirement comprising that data has been read from a memory location identified by that update transaction, the update unit configured to defer serialized update transactions pending satisfaction of the serialization requirement.

16. The apparatus for concurrent computation of claim 4, wherein the update unit further comprises a comparison unit configured to evaluate a plurality of values in an update transaction to select which value of the plurality of values, if any, to use in updating a memory location specified by that update transaction.

17. The apparatus for concurrent computation of claim 4, wherein the update unit further comprises a ready queue, and is configured to input an update transaction from the ready queue, to determine if the update transaction is ready to proceed, and to enqueue a memory transaction into the ready queue if the update transaction is ready to proceed.

18. The apparatus for concurrent computation of claim 4, wherein the update unit is configured to determine whether the inputted update transaction requires a lock on a memory location and if so, then performing the inputted update transaction in response to obtaining the lock.

19. The apparatus for concurrent computation of claim 4, wherein the update unit is further configured to perform the update transactions in an order based on a priority value associated with an update transaction.

20. The apparatus for concurrent computation of claim 4, wherein the update unit is further configured to prioritize update transactions that require locking a respective memory location and for which the lock has been achieved.

* * * * *